ROTARY MAGNETIC DATA STORAGE SYSTEM

Filed Aug. 4, 1948 10 Sheets-Sheet 1

INVENTOR.
DALE H. NELSON
BY
[signature]
ATTORNEY

March 6, 1956 D. H. NELSON 2,737,342

ROTARY MAGNETIC DATA STORAGE SYSTEM

Filed Aug. 4, 1948 10 Sheets-Sheet 2

INVENTOR.
DALE H. NELSON

BY

ATTORNEY

INVENTOR.
DALE H. NELSON
BY
[signature]
ATTORNEY

ROTARY MAGNETIC DATA STORAGE SYSTEM

INVENTOR.
DALE H. NELSON
BY
ATTORNEY

March 6, 1956 D. H. NELSON 2,737,342

ROTARY MAGNETIC DATA STORAGE SYSTEM

Filed Aug. 4, 1948 10 Sheets-Sheet 5

INVENTOR.
DALE H. NELSON
BY
ATTORNEY

INVENTOR.
DALE H. NELSON
BY
ATTORNEY

ROTARY MAGNETIC DATA STORAGE SYSTEM

INVENTOR.
DALE H. NELSON
BY
[signature]
ATTORNEY

ROTARY MAGNETIC DATA STORAGE SYSTEM

Filed Aug. 4, 1948 10 Sheets-Sheet 8

INVENTOR.
DALE H. NELSON
BY
ATTORNEY

INVENTOR.
DALE H. NELSON

BY

ATTORNEY

STORAGE AND COMPUTING UNIT - 17

INVENTOR.
DALE H. NELSON
BY
[signature]
ATTORNEY 2,737,342

ROTARY MAGNETIC DATA STORAGE SYSTEM

Dale H. Nelson, Southampton, N. Y., assignor to The Teleregister Corporation, New York, N. Y., a corporation of Delaware Application August 4, 1948, Serial No. 42,356

15 Claims. (Cl. 235—61)

Figure 1:
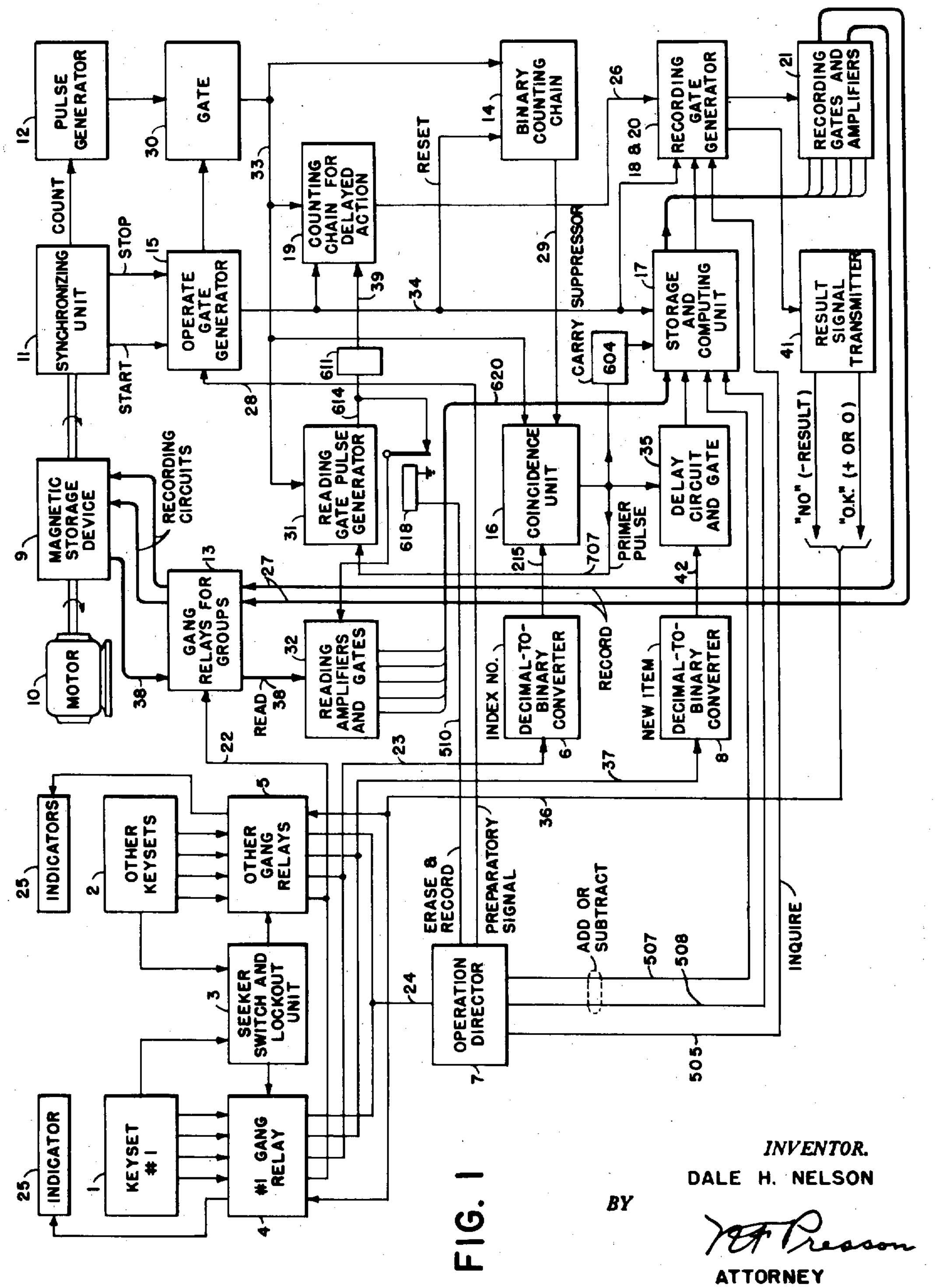

This invention relates to rotary magnetic data storage systems and particularly to improvements in such systems which will provide for handling numerous categories of classified statistical data. My invention is particularly well designed for seeking and quickly obtaining information regarding individual items of an inventory, also for automatically computing and posting new inventory balances from time to time to reflect the addition or subtraction of numerical items.

In a copending application of Edwin L. Schmidt, Serial No. 25,285, filed May 5, 1948, now Patent No. 2,587,532, issued Feb. 6, 1952, and assigned to the assignee of the instant application there were disclosed certain structures and techniques of operation of a magnetic data storage system. The objects of Schmidt's invention are similar to those of the instant case. Both in Schmidt's case and in mine, items of inventory statistics may be stored in a continuously rotatable magnetic member. In both cases the numerical items as stored are subject to inquiry for manifesting an existing balance for any selected item. Additions and subtractions may also be made at will, but, according to Schmidt, no means were disclosed for obtaining new inventory balances automatically.

In the instant application I have progressed beyond the disclosure of Schmidt by providing computing means and a so-called "operation director unit" whereby any one of three operations may be performed, namely, (1) To inquire regarding any selected item of an inventory whether or not the numerical balance therein is sufficient to meet a specified demand. (2) To automatically transfer into a computing unit a reading of a current numerical balance of a selected inventory item, subtract therefrom a given demand item and then to record the remainder item as a new inventory balance only if such balance would be positive. (3) To automatically transfer into a computing unit a reading of a current numerical balance of a selected inventory item, add to it a designated number, and then to record the sum as a new inventory balance. Each of these three alternative operations provides a manifestation of its having been performed. That is, an answer-back signal is sent to the control station from which the operation originates. One signal indicates the completion of the operation with a zero or a positive result for the new inventory balance; another signal indicates that a negative result was obtained and hence that the old inventory balance would not be disturbed.

Among the important features of my invention is a pulse generator and a binary counting chain operable in synchronism with the rotation of the magnetic storage device. This pulse generator and binary counting chain are subject to a preparatory signal from a control station and, when started, they provide for the operation of a coincidence gate which is a unit serving to compare two numbers. One of the numbers may be an index number for selecting an inventory item; the second is that which the binary counting chain reaches in order to establish coincidence for gating the read-out of a selected item as found on the magnetic storage device.

The coincidence gate for obtaining a reading from any selected point along a magnetic recording path enables one to introduce an old inventory balance into transient storage within a computing unit. A new item may then be entered into this computing unit and may be added to or subtracted from the item as read out. If the new item is to be added, the result will, of course, be positive. If however, the new item is greater than the old item and is to be subtracted, a negative result will be obtained and can be used for transmitting a negative answer-back signal. This negative result may also be used to prevent the erasure of the old inventory balance. But when a positive result is obtained, either from an additive or a subtractive operation in the computing unit, then the new balance of the inventory item is automatically transmitted to the recording heads. The recording heads are displaced with respect to the reading heads by a sufficient arc of distance along the recording paths to allow for the subsequent time of transmission of any new inventory item with respect to the time of reading the old inventory item. The new record will be superimposed upon the old by means of magnetizing forces which produce saturation, therefore canceling the old record without necessity for the use of erasing heads.

It is among the objects of my invention to provide equipment which may be conveniently and expeditiously operated in the manner hereinabove described. More particularly, the following objects are to be obtained:

1. To provide magnetic data storage equipment for posting and examining individual items of an inventory.

2. To provide computing equipment for use in combination with a magnetic data storage device whereby an item of any specified category may be added to or subtracted from an inventory, the resultant new inventory balance of that item being then automatically stored in said device.

3. To provide signal responsive means in an inventory posting system whereby inventory balances may be maintained for each of a plurality of item categories in terms of binary digits, the source of signals for transmission to said responsive means being one in which the items to be added to or subtracted from said balances are expressed decimally.

4. To provide informative signaling means in combination with a magnetic data storage device whereby an existing inventory balance in any specified category may be examined for its sufficiency to meet a specified demand, said signaling means being automatically controlled to deliver a "yes" or "no" response to an inquiry signal group which includes signals giving the numerical value of said demand.

5. To provide informative signaling means in combination with a magnetic data storage device whereby a remainder balance of a specified item category may be examined after subtracting a given number from the previously stored numerical value of the item, said signaling means being automatically controlled to deliver one of two responses depending upon whether said remainder balance is positive or negative.

6. To provide a rotary magnetic data storage unit in combination with suitable equipment for carrying out any of the previously stated objects.

7. To provide electronic gating means in combination with a continuously rotatable magnetic data storage unit whereby old items may be individually examined and new item balances may be posted in their proper places on said unit.

In the following description of a preferred embodiment of my invention, it will be seen that the foregoing and other objects are achieved. Certain advantages will also be made apparent. This description is accompanied by drawings in which:

Figure 1 is a block diagram showing a preferred arrangement of components the cooperation between which will be hereinafter explained;

Figs. 2 to 10 inclusive have been drawn as a comprehensive circuit diagram of an operative inventory system. In order to trace certain circuits from one to another of the several sheets they should be put together according to Fig. 11; and Fig. 12 shows a structural detail of a synchronizing disc and associated reading heads.

Figure 10:
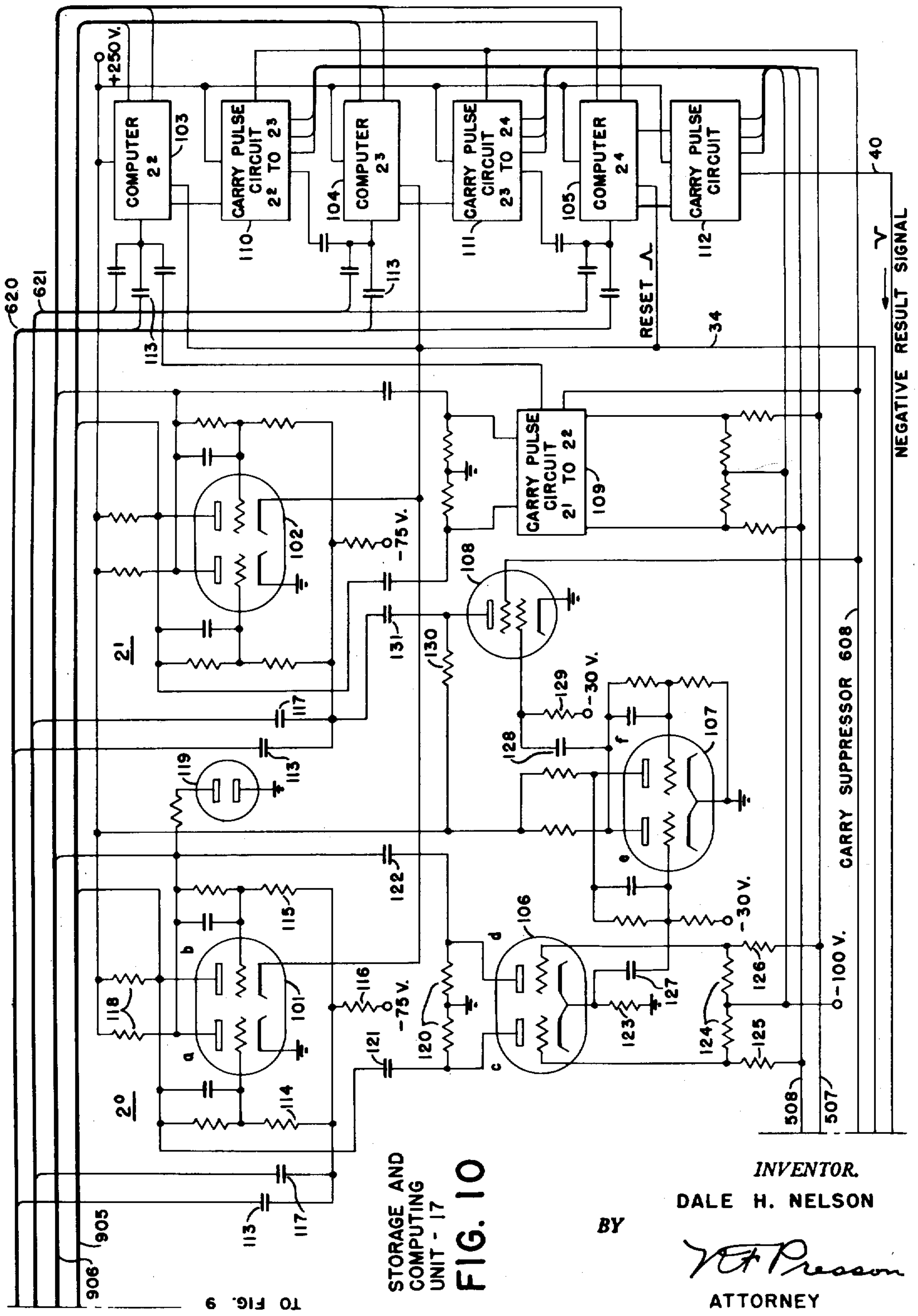

In the drawings multiple conductor cables have been shown by heavy lines with rounded corners where their direction is changed. Single conductors are also rounded out from such cables. Single conductors are shown as thin lines with square corners where their direction is changed. Reference numerals below 100 are generally used for components which appear in Fig. 1 as well as in other figures. Components shown in Fig. 10 are referenced by numbers in the range 100 to 199. The hundreds digit of other reference numbers will generally correspond with the figure on which the part will be found.

Referring to Fig. 1, I show therein a keyset 1 and other keysets 2 which may be conveniently placed for operation by personnel charged with the duty of using the inventory and introducing new items into it. In order to avoid conflicting operating between different keysets, a seeker switch and lock-out unit 3 is provided. The characteristics and method of operation of this unit may be the same as disclosed in the aforementioned Schmidt application. The control circuits from each of the keysets are connected to common equipment through a gang relay which is closed by the seeker switch 3 whenever an inventory change or posting is to be made or whenever inquiry is to be made as to the sufficiency of a current balance in a selected item category. One of the gang relays 4 is associated with keyset 1. Other gang relays 5 are associated respectively with the other keysets 2.

The keysets are preferably provided with digital rows of numerical keys, the same as on a full keyboard adding machine. Certain rows of keys represent the digits for group selection of an item. Other rows represent the index number of an item in any particular group. For example, if my inventory is to be used as a "Reservisor" for handling air transport reservations, then the group selectors may refer to different days and the item selectors may refer to different flight numbers for any one day. If the magnetic storage unit is to be composed of separate discs all mounted on a continuously rotating shaft, then all of the flights as numbered for any one day may be assigned to different positions along the recording paths of a single disc and different discs may represent such flights for different days.

Among the circuits which are closed by any of the gang relays 4, 5 are relay operating circuits represented by cable 22 which are used for selecting one of a number of group relays 13 representing a group of items such as would be recorded on a single disc.

Cable 23 leads from the gang relays 4, 5 to a decimal-to-binary converter 6. Individual conductors from keys of the keyset in use are directed through the windings of certain relays in the converter unit 6 and caused to translate the decimally composed index number into an equivalent binary number.

A coincidence unit 16 is composed of electronic circuits which are subject to dual control for establishing coincidence of two binary numbers as desired from two sources. The first source is the converter unit 6. The second source is a binary counting chain 14 which receives counting pulses through a gate 30 from a pulse generator 12.

The pulse generator 12 is locked in step with pulses delivered by a synchronizing unit 11. This unit includes reading heads associated with a synchronizing disc 1201, the disc being mounted on and continuously rotated by the shaft which carries other discs of a magnetic storage device 9. The shaft is driven by a motor 10. The synchronizing disc 1201 carries means for so exciting an electro-magnetic reading head as to deliver a train of pulses to the pulse generator 12 during each revolution. Such means may be a recording of magnetized spots which is scanned by the reading head. Or it may be the low magnetic reluctance of the disc itself in comparison with the high reluctance of an air gap as obtained by perforating the disc with equidistantly spaced holes along the path which the reading head scans.

The synchronizing unit 11 also functions to deliver a start-pulse and a stop-pulse to an operate-gate-generator 15, the function of which is to control the gate 30 for conditioning the later to pass the output from the pulse generator 12 to each of several units, 14, 16, 19 and 31 during a portion of a single revolution of the synchronizing disc 1201. The single revolution is chosen by the keyset operator when he depresses one of his "operate" keys and causes a selected relay in an operation director unit 7 to deliver a preparatory signal over conductor 28 to the unit 15.

The binary counting chain 14, like any revolution counter, operates to manifest a continuously progressive registration of binary numbers. When the number corresponding to that set up in the coincidence until 16 is reached, a so-called primer pulse is delivered to a reading gate pulse generator 31 for conditioning it to respond to the next succeeding counting pulse as delivered through the gate 30.

From the foregoing description it will be seen that an output pulse from the reading gate pulse generator 31 can be suitably timed with respect to the revolutions of the magnetic storage device 9 so that any selected item record among those recorded around the recording path may be read out and placed in transient storage, as in a storage and computing unit 17.

In the embodiment of my invention as herein disclosed for purposes of showing a specific application, I preferably provide four keys on each keyset for selecting the mode of operation of the system. A separate circuit from each key is carried through one or another of the gang relays 4, 5 to a relay in an operation director unit 7. All of these circuits are contained in cable 24.

THE OPERATION DIRECTOR 7

Four alternative operations are provided for—(1) to inquire as to the availability of a wanted balance; (2) to subtract a new item from the old; (3) to add a new item to the old; and (4) to delete an old balance while recording a new item. As previously stated, when an inquiry signal is given, the storage and computing unit 17 is not allowed to disturb the existing balance of the selected item; it will only report whether a positive or negative result has been obtained from subtracting the new item from the old.

As an illustration of the type of system in which this inquiry is of advantage, I refer again to the use of my invention as a Reservisor. Assuming that a traveler wishes to be informed as to available seats for a particular flight on a particular date, the agent presses his "Inquire" key after setting up the selected date and flight keys and causes the existing balance of available seats to be read out of the storage device. Because this is merely an inquiry the "Inquire" key functions to disable the recorder so that the current inventory balance will not be disturbed. The agent has also pressed a key or keys indicating the number of seats which would be wanted. The computing unit 17 then subtracts the number of seats wanted from the balance read out of the storage unit and immediately transmits an answer-back signal to an indicator 25 which gives an "OK" or "No" answer. The "OK" signal is transmitted when the result of subtraction is either positive or zero. The "No" signal is given when the remainder is negative.

The operation director 7 is used in the same manner, but under control of a different key, when a reservation is actually made and one or more reserved seat tickets are sold to the customer. In this case, however, the number of seats which are withdrawn from the available number of seats requires the posting of a new inventory balance. Thus signals must be transmitted to the recording heads at an instant when the selected recording position for this item has reached the recording heads. The displacement between reading heads and recording heads is coordinated with a certain time lag of the recording operation with respect to the reading operation. This delay is obtained by means of a counting chain 19 which is jointly controlled by the pulse generator 12 and by a gate pulse from the reading gate pulse generator 31. The gating pulse from the counting chain 19 is rendered ineffective when the "Inquire" key is set. The "Sell" and "Cancel" keys are used, however, whenever a revised inventory item is to be recorded. In either of these cases a pulse from the final stage of the counting chain 19 is gated through a gate 20 to the recording gates and amplifiers of unit 21.

The "Sell' key functions to control the computer 17 so that it will subtract the new item from the old balance. The "Cancel" key functions to cause the addition of the two items by the computer. When subtracting the new item from the old, it is arranged that the recording amplifiers 21 shall transmit the necessary signals to the recording heads to store the new balance, but only when this balance is a positive number or zero. The gate 20 is disabled in the event that the computer 17 delivers an output signal showing a negative balance.

From the above it will be observed that the gate 20 is subject to joint control by the counting chain 19, by the "Operation Director Unit" 7, and by the result of operation of computer 17. No recording will be made in response to the setting of the "Inquire" key. Furthermore in response to the setting of the "Sell" key, the recording will be made only when the computer obtains no negative result. The Add (+) key always permits a recording to be made. The "R" and (+) keys when simultaneously set permit direct recording of a new item.

The output circuits from unit 21 are individual to the digits of the binary number to be recorded. These output circuits are contained in cables 27 leading through the gang relays 13 to the recording heads. Selective operation of one of these gang relays determines the particular set of recording heads which is to be affected.

For any of the operations as obtained by the selective control of the operation director 7 it is necessary to apply a preparatory signal to an operate gate generator 15. This signal is fed from the operation director to the operate gate generator through conductor 28 and causes a start pulse from the synchronizing disc 11 to be effective for initiating the action of a binary counting chain 14. This chain 14 is locked in step with a train of pulses delivered by a pulse generator 12, which, in turn, is synchronized by output from a reading head that scans a series of equally spaced holes in the synchronizing disc 11. I shall presently show that several of the components of my system are dependent upon the output from the counting chain 14 for their proper functioning. On release of the operated start key the entire equipment is restored to normal and made ready for handling a subsequent transaction.

THE KEYSET AND ASSOCIATED CIRCUITS

Figure 2:
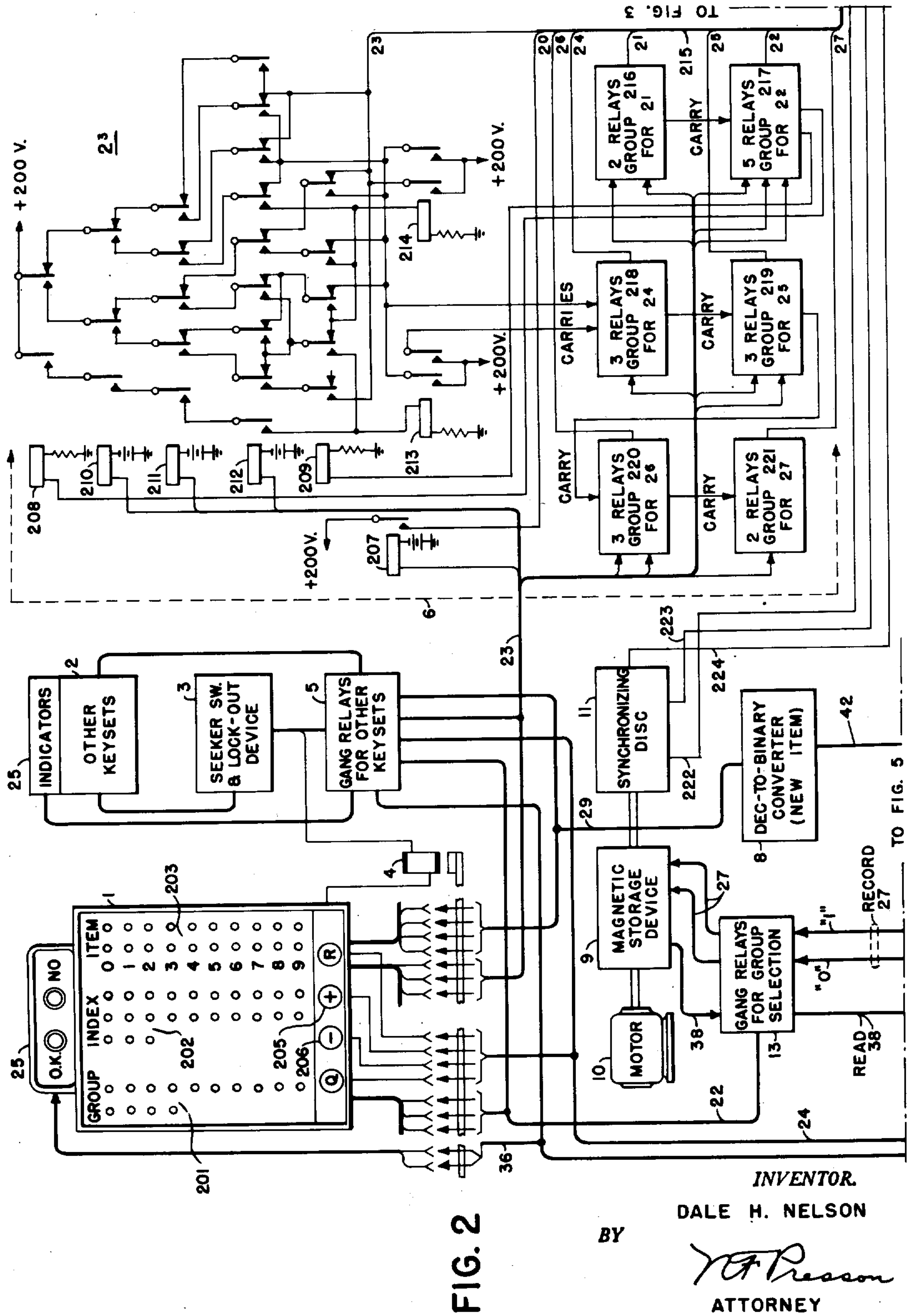

The following description will be best understood by reference to Figs. 2 and 10 inclusive, considered as a detailed circuit diagram. The arrangement of these figures is in accordance with Fig. 11.

Referring first to Fig. 2, I show therein a keyset 1 having three main groups of numerical keys and four keys for directing the mode of operation of the common equipment. Key group 201 may be used for selecting and operating one of several gang relays 13. These relays are provided with multiple contacts for establishing connections between the common equipment and a selected group of reading and recording heads within the unit 9, which is a magnetic data storage device of the type shown and described in the aforementioned Schmidt patent. A basic characteristic of unit 9 is that its moving element is arranged to carry multiple data recording tracks and these tracks are scanned by the reading and recording heads. The scanning operation becomes effective only when information is to be read out of or injected into the storage device at a selected point along a selected group of recording tracks.

Different points along each group of recording tracks are assigned to different categories of items according to their respective index numbers. Numerical values of the items are represented by binary numbers each digit of which is recorded in a different track. The recording is in the form of a magnetized spot the north-south axis of which is oriented in one direction to represent the number "0" and in the opposite direction to represent the number "1." The recording heads have double windings for selective use to produce the spot magnetization which will represent either "0" or "1" as wanted at any particular point.

Since the recording tracks are endless, that is, circular or carried on a belt, the scanning cycle for giving access to any desired item category need not be unduly prolonged if group selection of items is resorted to, as by means of the gang relays 13. In other words, the number of categories of items may be increased to any desired limit without increasing the access time, simply by the provision of multiple groups of tracks and their associated groups of reading and recording heads.

The keys of group 202 may be set to represent the index number of any item and will thus serve to control the common equipment so as to perform a reading or recording operation at the instant when the appropriate spot position of the selected item comes into scanning relation to the reading heads or the recordings heads respectively.

New items may be set up on keys of the group 203 and may be treated by the common equipment in one of several different ways according to the selective setting of certain operation-directing keys. Key 205 causes the new item to be added to a balance stored in the magnetic storage unit 9. Key 206 causes the new item to be subtracted from the old balance, but only if a "0" or positive remainder would result. Key labeled Q is used for interrogating the relation between an old balance of an item and a requisition for withdrawal of a new item from the old balance. If the new item when subtracted from the old balance would leave a positive or zero remainder, this fact is to be manifested by lighting an "OK" lamp in an indicator panel 25. A negative remainder would be manifested by lighting a "No" lamp.

The Q-key when set for interrogation, as above described, does not allow the numerical value of the recorded item to be disturbed. But when the new item is to be added to or subtracted from the recorded item and the result is to be recorded in place of the old item, these operations are accomplished by setting one or the other of the two keys 205 and 206 which are marked "+" and "—" respectively. Another key labeled "R" is provided for the purpose of injecting a new item into the record at any selected point without any reference to what is already stored thereat. The R-key is therefore useful when it becomes desirable to erase the old item and to substitute a new item under the same index number.

Figures 5, 11:
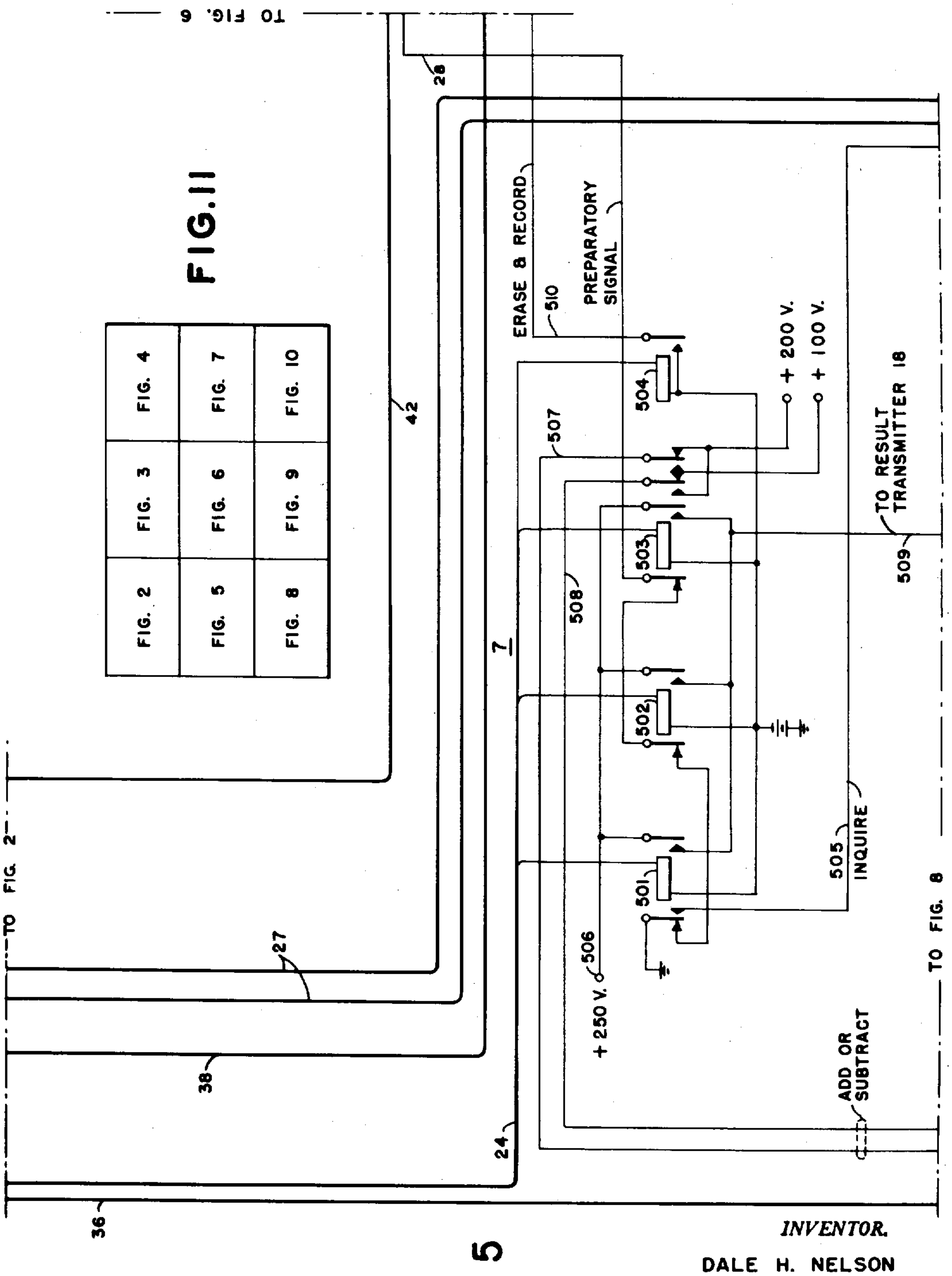

Each of the keys Q, 205, 206 and R is connectable through an operated gang relay 4 to an appropriate relay winding in an operation director unit 7, Fig. 5. The numerical keys of groups 201, 202 and 203 have contacts for closing certain selecting relays in the common equipment. The control circuits for all these relays are branched through different contacts of the gang relays 4 and 5 to different keysets 1 and 2. Relays 4 and 5 are operated singly under control of the seeker switch and lock-out device 3, all in accordance with the teachings of Schmidt in his aforementioned copending application.

THE DECIMAL-TO-BINARY CONVERTERS

For the purpose of minimizing the number of conductors from keys of the keyset to the common equipment, some of these keys may be provided with multiple contacts and the contact connections may be coded to obtain suitable operation of a decimal-to-binary converter. Two of these converters, 6 and 8, are shown in the diagram. The index number of the item is translated by converter 6 from a decimal number into a binary number. Likewise the converter 8 makes an equivalent translation for representing in binary code the numerical value of the new item. These converters enable the keyset operator to set his decimally arranged keys in the well known manner of adding machine manipulation. This avoids the difficulty of mentally translating decimally expressed numbers into the binary code.

The decimal-to-binary converter 6 is shown in sufficient detail to explain the principle of translation. The decimal-to-binary converter 8 may be the exact equivalent of 6 or it may have a capacity for translating decimal numbers of more or less digits than with converter 6.

Referring to the arrangement shown for converter 6, I show therein a relay 207 which is operable from any one of the odd numbered keys in the units' column of group 202. The contact closed by this relay 207 feeds a potential of +200 volts into a voltage divider bus labeled $2^\circ$ in cable 215 for the purpose of exercising partial control over the grid in the left-hand section of a twin triode tube 701, this tube being one which represents the units' digit of a binary number. Tubes 701, 702, 703, etc. form a group of digit-representing components of a "Coincidence circuit" 16. All of the tubes of this group are subject to joint control from the converter 6 and from the binary counting chain 14, as will be explained presently.

The decimal-to-binary converter unit 6 comprises a number of relay groups labeled according to the binary digit of their respective output circuits. Each relay group has a pyramidal contact arrangement for switching its +200 volt apex potential into an appropriate conductor of cable 215, these conductors being also labeled according to the binary digits and being connected to different voltage divider busses in the coincidence unit 16. One or more carry pulse output circuits are provided at the base of certain pyramidal contact arrangements, so that the permutational setting of relays of one group may exercise a suitable control over carry relays in a group of the next higher digital order.

The underlying principles of code conversion are more or less well known and apply to the requirements of a decimal-to-binary converter of the type herein shown, so that it does not appear to be necessary to develop the details of pyramidal contact arrangements of the relay group for each digital place of the binary number. I have, therefore, shown, by way of example, the pyramidal contact arrangement for controlling the connection of the +200 volt source to the bus $2^3$ and, as needed, to one or both of two carry relays in the relay group pertaining to binary digit $2^4$.

Relay group for digit $2^3$ comprises relays 208 and 209 which are carry relays operable from output circuits in the $2^2$ pyramidal arrangement. Relays 210, 211 and 212 are controlled by certain keys 202 in the units, tens and hundreds rows respectively.

Blocks 216 to 221 inclusive represent relay groups having their contact arrangements of pyramidal form and suited to the selection of different binary digits. The pyramidal contact arrangement in each block is generally of simpler composition than is shown for the digit $2^3$. The principle governing this composition is as follows:

An appropriate binary digit "0" is indicated in case none of the relays of a given group are operated; also in case any even number of the relays is operated. Operation of any relay singly indicates the binary digit "1" and applies the +200 volt potential to the appropriate conductor in cable 215. The same result is also obtained from operation of any odd number of the grouped relays. Any three relays operated simultaneously call for an operating potential to be applied to the appropriate output conductor of cable 215, and at the same time to a carry circuit which includes a relay in the group of next higher order. Any four relays operated simultaneously will remove the operating potential from the digital output circuit and will empower two carry circuits each leading through a separate relay in the group of next higher order. In the group for digit $2^3$ it should be noted that there are two supplemental relays, 213 for dual carry circuit closures and 214 for closing one carry circuit together with a digital output circuit. Relay 209 may or may not be operated when relay 208 operates, but cannot operate without relay 208 because it responds to a second carry circuit closure from the relay group of next lower order.

As for the circuits to different relays of the respective groups in the converter unit 6, the setting of keys 202 to represent any index number from 1 up to 255 requires only twelve conductors in cable 23. Four of these conductors are connected to suitable grounding contacts of keys in the units column. Six conductors are connected to such contacts of keys in the tens column. Keys "1" and "2" in the hundreds column have individual single conductors for respectively operating a relay in group $2^5$ and $2^7$, provided that that relay in group $2^5$ has additional grounding contacts for operating relays in groups $2^3$ and $2^6$. This provision of single conductors for keys "1" and "2" in the hundreds column is optional and feasible where the index numbers higher than 255 are not to be used. Alternatively the hundreds keys would have multiple grounding contacts. The "0" keys require no contacts in any case and are merely used to release the conventional interlock. To summarize the disclosure of a suitable arrangement of circuit connections between the keys 202 and the relays of the converter unit 6 the following table is offered without need for further explanation, other than to state that the principles of decimal-to-binary conversion as exemplified herein may be extended to cover conversion of decimal numbers having as many digits as may be desired. At the bottom line of the table I show the number of carry circuits which are required to lead out from the relay group of each binary digit and which exercise control over carry relays in the relay group of next higher order.

*Binary digits called for by key circuit closures*

UNITS COLUMN

| Keys 202 | $2^7$ | $2^6$ | $2^5$ | $2^4$ | $2^3$ | $2^2$ | $2^1$ | $2^0$ |
|---|---|---|---|---|---|---|---|---|
| 1 | ---- | ---- | ---- | ---- | ---- | ---- | ---- | x |
| 2 | ---- | ---- | ---- | ---- | ---- | ---- | x | ---- |
| 3 | ---- | ---- | ---- | ---- | ---- | ---- | x | x |
| 4 | ---- | ---- | ---- | ---- | ---- | x | ---- | ---- |
| 5 | ---- | ---- | ---- | ---- | ---- | x | ---- | x |
| 6 | ---- | ---- | ---- | ---- | ---- | x | x | ---- |
| 7 | ---- | ---- | ---- | ---- | ---- | x | x | x |
| 8 | ---- | ---- | ---- | ---- | x | ---- | ---- | ---- |
| 9 | ---- | ---- | ---- | ---- | x | ---- | ---- | x |

TENS COLUMN

| | | | | | | | | |
|---|---|---|---|---|---|---|---|---|
| 10 | ---- | ---- | ---- | ---- | x | ---- | x | ---- |
| 20 | ---- | ---- | ---- | x | ---- | x | ---- | ---- |
| 30 | ---- | ---- | ---- | x | x | x | x | ---- |
| 40 | ---- | ---- | x | ---- | x | ---- | ---- | ---- |
| 50 | ---- | ---- | x | x | ---- | ---- | x | ---- |
| 60 | ---- | ---- | x | x | x | x | ---- | ---- |
| 70 | ---- | x | ---- | ---- | ---- | x | x | ---- |
| 80 | ---- | x | ---- | x | ---- | ---- | ---- | ---- |
| 90 | ---- | x | ---- | x | x | ---- | x | ---- |

*Binary digits called for by key circuit closures*—Continued

HUNDREDS COLUMN

| | | | | | | | | |
|---|---|---|---|---|---|---|---|---|
| 100 | ---- | x | x | ---- | ---- | x | ---- | ---- |
| 200 | x | x | ---- | ---- | x | ---- | ---- | ---- |
| Carries | 0 | 1 | 1 | 1 | 2 | 2 | 1 | 0 |

THE OPERATION DIRECTOR

Four relays 501 to 504 inclusive (Fig. 5) are separately actuated by keys "Q," 206, 205 and "R," respectively, in any one of the keysets. Connections between the keys and the relay windings are carried through contacts of an operated gang relay 4 or 5 and through cable 24.

Key "Q" is used to interrogate the inventory balance for any item which is identified by the setting of keys 201 and 202. Relay 501 upon operation by the Q-key removes ground potential from the preparatory signal line 28 to initiate a scanning operation whereby the wanted item may be read from the magnetic storage device 9. Previous to the operation of relay 501, or of either of the relays 502 and 503, the normal ground potential of line 28 prevented any response to the start signal which is obtainable once each revolution of the synchronizing unit 11, as will be explained presently.

Relay 501 upon operation, grounds conductor 505 and through it the upper terminal of a resistor 804 which normally serves as a load for a gating pulse delivered by tube 20 when the screen grids of the recording tubes (Fig. 9) are to be raised for actuation by a gating pulse. Such actuation is prevented by the operation of relay 501, since in this case the existing inventory record is not to be disturbed.

Each of the relays 501, 502 and 503 has make contacts for connecting a high potential source 506 to the anodes of two gaseous tetrodes 805 and 806 which are components of the result storage and answer-back unit 18. Relay 502 is operated by the "Sell" key 206, which is marked with a minus sign (—) because a new item when sold must be subtracted from the inventory. Relay 502 serves only to remove ground potential from the preparatory signal circuit 28 and to connect the source 506 to the anodes of said gaseous tetrodes 805 and 806.

Relay 503 is operated by the "Cancel" key 205, which is marked with a plus sign (+) because a new item representing a cancellation is the reverse of a sale and involves an addition to the inventory. The two functions performed by relay 502 are also functions of relay 503 and at the same time relay 503 serves to reverse the connections of two conductors 507 and 508 to two direct current sources of, say, +100 volts and +200 volts respectively. These voltages serve to bias a twin triode tube 106 and similar tubes in the carry circuits of the computer 17 so that they will respond to carry pulses as required for addition. When relay 503 is not operated the proper voltages are applied to conductors 507 and 508 so as to cause the computer 17 to subtract the new item from the recorded item.

Relay 504 is operated by a key marked "R" in the keyset. It should be understood that in the instant embodiment of my invention the R-key is never to be set except together with key 205, although of course, key 205 may be solely set for adding the new item to the old inventory balance as described in the preceding paragraph. By setting both keys the read-out of the current inventory balance is avoided so that only the new item is entered in the computer 17 and when this item is gated through the recording amplifiers to the recording heads it supplants the previously existing record.

THE SYNCHRONIZING EQUIPMENT

Figures 7, 12:
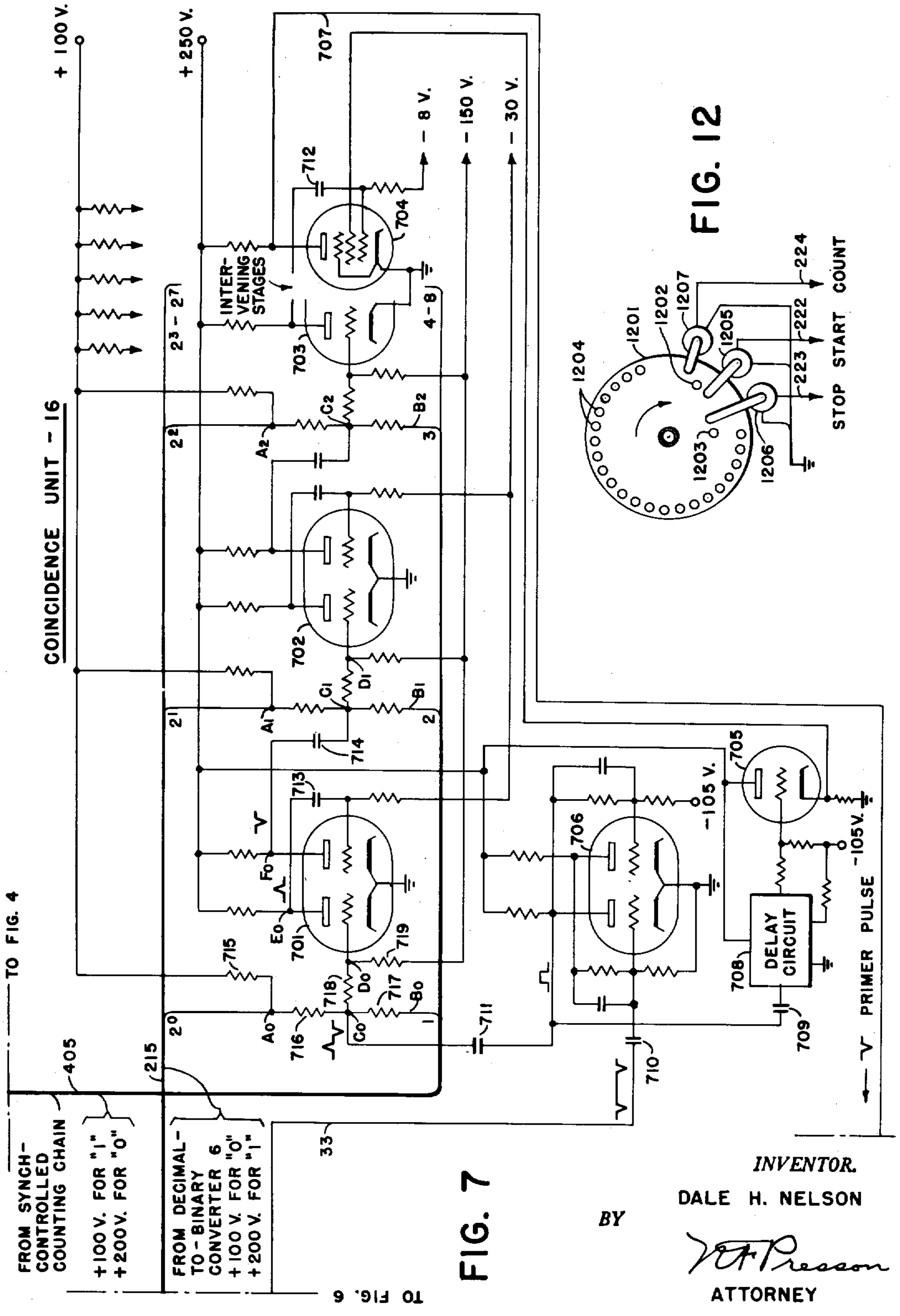

A synchronizing unit 11 is shown in Fig. 12 and its cooperation with other components of the system is conventionally indicated by block 11 in Figs. 1 and 2. Unit 11 is composed of a disc 1201 of high magnetic permeability mounted on a shaft together with a rotor element of the magnetic storage device 9. In a preferred embodiment of my invention the disc is perforated with a start hole 1202, a stop hole 1203 and a series of counting pulse holes 1204. The disc is straddled by the yokes and pole pieces of three different electromagnetic pick-up heads 1205, 1206 and 1207. The pole pieces are so formed and so mounted as to offer a minimum mechanical clearance with respect to the faces of the disc and are radially positioned so that each scans a different orbit in which the start, stop and counting holes respectively lie.

A magnetic field is obtained between the pole pieces of each pick-up head, this field being subject to variations of reluctance as the disc holes are scanned. Therefore a pulse is generated in the winding of each pick-up head with the passage of a disc hole between the pole pieces. This method of generating pulses is only one of several which are well known in the art. I do not intend, therefore, to limit the scope of my invention to the adoption of this particular feature for synchronizing purposes.

THE OPERATE GATE GENERATOR

One during each revolution of disc 1201 a pulse is generated in the start circuit which includes the winding of pick-up head 1205, grounded at one terminal, and extending from the other terminal through conductor 222 to capacitors 301 and 302. There the pulse energy is split and traverses two paths to ground, it being noted that such paths to ground are taken through separate resistors 319 and 320, also through a negative biasing source of —8 volts in one circuit and a negative biasing source of —30 volts in the other circuit. The values given for these biasing sources are, of course, merely illustrative.

A pentode discharge tube 303 is normally held nonconductive by the impress of the —8 volt biasing potential on its control grid, the biasing circuit including resistor 319. The anode potential is applied to this tube through a resistor 321. The output circuit includes a capacitor 310 which is connected between the anode of tube 303 and the normally grounded preparatory signal conductor 28. So, start pulses delivered by tube 303 are dissipated through capacitor 310 to ground prior to the actuation of one of the operation director relays 501, 502 or 503. Upon the removal of ground from circuit 28, a twin triode flip-flop 309 responds to the next succeeding start pulse which results from driving tube 303 conductive. This pulse now traverses resistor 322 and a biasing source of, say, —75 volts to ground. The left triode section of tube 309 was previously held conductive by ground potential on its grid. The start pulse blocks it and the right-hand section becomes conductive. It remains conductive for an indefinite time until ground potential is restored to conductor 28 at the moment of release of the common equipment by the operated keyset.

A pentode tube 306 is arranged for response to stop pulses generated by the scanning action of pick-up head 1206 when a stop hole in the disc 1201 is sensed. Tube 306 is normally biased to cut-off by a —8 volt source applied through resistor 323 to its control grid. All pulses generated by the pick-up heads of the synchronizing unit 11 are substantially single-cycle sine waves the negative half cycles of which are ineffective because they are applied to the grids of tubes normally biased to cut-off. So the trailing half-cycle of the stop pulse, which is positive, produces a momentary conductive state in tube 306, thereby causing its anode potential to drop and to deliver a negative pulse through capacitor 317, resistor 324 and the —75 volt biasing source to ground. This is a reset pulse for repeatedly exercising control over the left-hand section of tube 312 for blocking the same until such time as it may be controlled by a start pulse applied negatively through capacitor 311 in order to block the right-hand section and thus to establish a long gate control for utilization of the indexing equipment.

The cooperation between tubes 309 and 312 is such that a cathode follower tube 313 is rendered conductive during less than one revolution of the disc 1201; more precisely, from the scanning of the start-pulse to the scanning of the stop-pulse. This is a period for finding and reading any desired record as stored on the magnetic storage device 9.

When a reading and/or recording operation is accomplished, as directed by any particular set-up of a keyset, it cannot be repeated, but, after transmitting an answer-back signal to the indicator lamps 25. I follow the teachings of the aforementioned patent of Schmidt, in that I cause the operated gang relay 4 or 5 to be released automatically, so that, as soon as possible, the common equipment may be prepared for subsequent seizure by any one of the keysets.

The circuit arrangement of the operate gate generator unit 15, including tubes 303, 306, 309 and 312 avoids the repetition of operational cycles thus: After once removing ground potential from the preparatory signal line 28 (as above described), the next and no other start pulse becomes effective in triggering tube 309. This tube then remains conductive on the right side until the actuated operation director relay is released. Tube 312 prior to the instant of triggering tube 309 was maintained conductive on the right side by repeated stop pulses. A shift of its conductive state to the left side is made possible by a negative pulse through capacitor 311 at the instant when tube 309 shifts from left side to right side conductance. The next succeeding stop pulse restores tube 312 to a conductive state on the right side, and subsequent stop pulses only confirm that condition. Hence the period of the open gate for any scanning cycle is restricted to the time interval between one start pulse and the subsequent stop pulse.

THE COUNTING PULSE GENERATOR 12 AND GATE 30

A train of counting pulses is picked up by the reading head 1207 in the Synchronizing Unit 11. This train is prefaced by the start pulse and is followed by the stop pulse as explained in the foregoing description. The counting pulses are carried from reading head 1207 through conductor 224, capacitor 307, resistor 325 and a biasing source of —30 volts to ground. Resistor 325 is connected in the input circuit of an amplifier tube 308. Anode potential is supplied to this tube through resistor 326 and anode potential variations are applied through capacitor 327 to the junction between resistors 315 and 316, where the separate terminals of these resistors are connected respectively to the control grid of tube 314 and to a biasing source of —8 volts.

Tube 314 is preferably a pentode subject to control for conductance by the application of counting pulses to its control grid whenever its screen grid potential is made sufficiently high by a conductive state in the cathode follower tube 313. Tube 313 is conductive between start and stop pulses, as has already been explained. It therefore provides long gate, or primer control for tube 314.

The counting pulse gate unit 30 shown in Fig. 1 may be considered to include tubes 308, 314 and their associated circuits, and in addition a 2-stage amplifier 318. Tube 314 has its anode connected to a suitable source, say +250 volts, through resistor 329 and delivers output pulses through capacitor 330 to the amplifier unit 318. The output circuit from the latter is shown as a counting pulse bus 33 which leads to various other units of the system for timing their functions.

THE RESET PULSE GENERATOR

It was stated above that the start pulse from reading head 1205 is directed through conductor 222 to two separate paths to ground, one being through capacitor 301 for the purpose of actuating the Operate Gate Generator 15. The other path of the start pulse energy traverses capacitor 302, resistor 320 and a biasing source of —30 volts. The control grid of a reset tube 304 is connected to the junction between capacitor 302 and resistor 320. Tube 304 is a cathode follower, here shown, for example, as a tetrode with its anode and screen grid interconnected for operation as a triode. The value of the cathode resistor 331 is suitably chosen so that a reset pulse of sufficient amperage may be applied to a reset bus 34 for restoring to normal a number of trigger tubes in various units of the system prior to the exercise of control thereof by the counting pulses or other gating pulses. Thus in units 14, 17, 18 and 19 all flip-flop tubes are reset for an initial conductive state on the proper side thereof.

THE COUNTING CHAIN FOR THE COINCIDENCE UNIT

Figure 4:
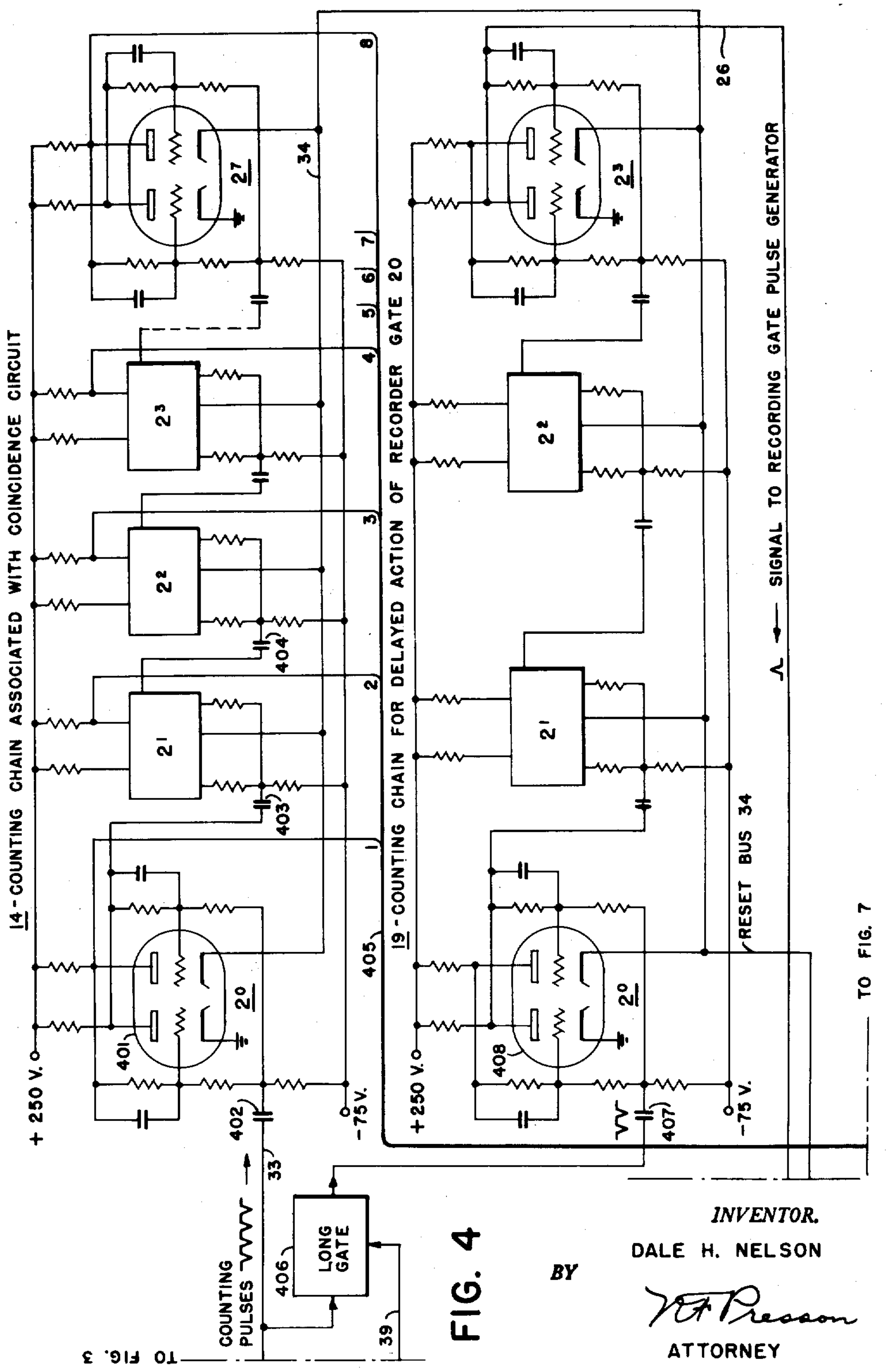

The purpose of the counting chain unit is to identify successive positions along the recording tracks according to their index number. This counting chain comprises a flip-flop circuit stage for each of the digits of the binary numbers representing the index numbers of the items. The twin triode tube 401 and its associated circuit arrangement constitutes the flip-flop stage for the digit of the first order $2^0$. The flip-flop stages for digits $2^1$, $2^2$, $2^3$ . . . $2^7$ are also indicated in Fig. 4.

Before the start of the counting chain operation each of the flip-flop tubes receives a reset pulse over the reset bus 34 from the cathode of tube 304. This pulse is applied to the cathode of the right-hand section of each tube, thus making this section nonconductive and the left-hand section conductive. Each flip-flop stage is designed to hold its one-sided conductive state until triggered by a negative pulse applied to its grid. Such a pulse has no direct effect on the nonconductive section, but blocks the conductive section.

Counting pulses from the amplifier 318 are impressed on bus 33 and through capacitor 402 for actuating the flip-flop stage 401. Each pulse throws the conductive state from one side to the other. In stage $2^0$ even digits are represented by conduction on the left side, while odd digits are represented by conduction on the right side.

The flip-flop stage for digit $2^1$ is actuated by a negative pulse applied through capacitor 403 to the grids of this stage, the pulse being derived from the drop of anode potential on the left side of tube 401 upon reception of each even-numbered pulse over the counting pulse bus 33. In the same manner, the flip-flop stages for higher order digits of the index number, expressed in binary code, are each actuated by negative pulses from the stage of the next lower order, and each stage is triggered at half the frequency of the preceding stage.

From each stage of the binary counting chain as above described output potentials are furnished which progressively register the binary count of successive counting pulses applied through the bus 33. Cable 405 contains a plurality of conductors each of which is connected respectively to one of the digital stages of the counting chain and at the right hand anode thereof. Since the rate of delivery of the counting pulses to the counting chain is controlled by the rotation of the synchronizing disc 1201, it will be apparent that successive recording positions along the tracks of the rotor in the magnetic storage device (mounted on a common shaft with disc 11) may be identified by the same binary numbers which are expressed by the counting chain. So the conductors of cable 405 are extended to the electronic coincidence unit 16, Fig. 7, and respectively to the several digital stages thereof, for the purpose of comparison with a selected binary number representation as derived from the decimal-to-binary converter unit 6. This unit, it will be remembered, is set up in accordance with the manipulation of keys 202 on one of the keysets, in order to obtain a reading and/or recording operation with respect to the correspondingly indexed item as selected.

THE COINCIDENCE UNIT

The Coincidence Unit, shown in Fig. 7, operates to compare two separate binary expressions, at synchronous times, delivering an output signal at only that time which finds the two binary expressions in complete agreement. The first binary expression is the index number as obtained in the binary converter 6, (Fig. 2). This number comes to the coincidence unit through digital conductors in cable 215. At the converter end of these conductors an open circuit condition represents "0" and the impress of +200 v. on the conductor represents "1."

The second binary expression is derived from the Binary Counting Chain 14 (Fig. 4). It comes to the coincidence unit through conductors 1 to 8 inclusive in cable 405. Since the counting chain rearranges itself to register an orderly sequence of binary numbers at the cadence of the counting pulses from the synchronizing unit 11, it is apparent that these numbers correspond with different angular positions of the rotor in the magnetic storage device 9. The coincidence between the two binary expressions may, therefore, be used to time a read-out of the magnetically stored data at any indexed point along the recording track.

The binary numbers as expressed by the counting chain 14, being delivered to the coincidence unit 16 through cable 405, have been shown to result from the setting of each of the tubes 401 and the like for respective digits $2^0$, $2^1$ . . . $2^7$ so that the right-hand triode section represents "0" when nonconductive and "1" when it conducts. The anode potential can be shifted over a range of 100 volts. For the sake of illustration let it be assumed that the right-hand anode potential is +200 v. when its triode section is nonconductive and +100 v. when it is conductive. These potentials may then be applied to the control circuits of the coincidence unit 16 for joint control thereof together with the potentials applied through cable 215.

In the coincidence unit 16 twin triode tubes 701, 702, 703, etc., represent individual comparators for each digit of the two binary numbers. These tubes are preferably of type 6SN7GT. The left-hand section receives controls from the two sources through appropriate conductors in cables 215 and 405. The right-hand section is an amplifier and phase inverter for delivering an output pulse to the tube of next higher order whenever two 0's or two 1's are coincident.

The circuit components of tube 701, which compares the digits of the $2^{\circ}$ term will be described as typical of those for the other terms. The same mode of operation also holds for tubes 702, 703, etc.

The cathodes of tube 701 are grounded. The anodes are resistively connected to a source labeled +250 v. The left-hand and right-hand grids are connected to biasing sources of —150 v. and —30 v. respectively, the connection to the left-hand grid being through resistor 719. The terminals of conductors in cable 215 are labeled $A_0$, $A_1$, $A_2$, etc. The terminals of conductors in cable 405 are labeled $B_0$, $B_1$, $B_2$, etc. Resistors 716 and 717 serially interconnect terminals $A_0$ and $B_0$ and the junction between these resistors is labeled $C_0$. Resistor 718 is connected between two junction points $C_0$ and $D_0$ where $D_0$ is at the grid end of the bias resistor 719. Each of the junction points $A_0$, $A_1$, $A_2$, etc. has a connection through a resistor such as 715 to a source labeled +100 v.

The binary expression originating at the converter 6 is predetermined before the counting chain starts to operate and remains constant throughout the functioning of the counting chain. During this time, therefore, junction point $A_0$ will stand at substantially +100 v. if "0" is indicated, assuming negligible voltage drop through resistor 715, and at substantially +200 v. if "1" is indicated, this voltage being applied at the pyramidal apex of the binary converter relay contact group in unit 6.

The potentials applied to junction points $B_0$, $B_1$, $B_2$, etc., from the counting chain have already been stated as +200 v. for "0" and +100 v. for "1." These potentials and the potentials simultaneously applied to junction points $A_0$, $A_1$, $A_2$, etc., are averaged at junction points $C_0$, $C_1$, $C_2$, etc., resistors 716, and 717 being of equal value. Neglecting other influences for the moment, junction points $C_0$ and $D_0$ will stand at the potentials given thus for four possible conditions:

| Keyed Index | Binary Count | $C_0$, v. | $D_0$, v. |
|---|---|---|---|
| 0 | 0 | +150 | 0 |
| 0 | 1 | +100 | −25 |
| 1 | 0 | +200 | +25 |
| 1 | 1 | +150 | 0 |

The voltages shown above for junction point $D_0$ would be those due to the voltage drop through resistors 718, and 719 and neglecting grid current in tube 701. When grid current is considered the nominal value of +25 v. for $D_0$ is substantially reduced to zero volts. The effect of this condition is, however, distinguishable from that in which $D_0$ stands at zero volts and the grid draws no current, as will presently be shown.

In order that dependable comparisons may be made between digits of the same order in the two binary expressions a testing moment is chosen which follows each rearrangement of the counting chain. This is necessary in order to render the comparisons independent of spurious pulses generated by the digital tubes of the counting chain during shifts of their conductive states. Accordingly, I have found that such a testing moment may be obtained by means of signal pulses applied through capacitor 711 to point $C_0$, these pulses being generated by anode potential variations in a twin triode tube 706 which possesses suitable circuit parameters for operation as a delay circuit.

The circuit arrangement of tube 706 is similar to that of other twin triode tubes herein referred to as self-restoring single cycle multi-vibrators, or delay circuits. The left-hand triode section is normally conductive, but capable of being blocked, as by negative counting pulses applied over conductor 33 and through capacitor 710 to the left-hand control grid. Such pulses, it will be remembered, are synchronized with respect to the rate of item scanning by the reading heads.

Tube 706 when triggered by each counting pulse delivers a positive spike through capacitor 711 and when it recovers its normally conductive state, some 40 microseconds later, it delivers a negative spike through capacitor 711. Another delay circuit similar to that of tube 706 is indicated by block 708. It is triggered by tube 706 when the latter on recovery delivers said negative spike, some of the energy of which is fed through capacitor 709. With respect to delay circuit 708 its recovery time is of the order of 10 microseconds, this period being found to be sufficient to maintain a conductive gate 704 for the output of a coincidence signal when it occurs. This gating time makes ample allowance for the fact that when complete agreement is found between comparable digits of the two binary numbers, each tube 701, 702, 703, etc., is required to forward a control signal to the tube representing the next higher digital order, and the actual progression of signals from tube to tube is completed in considerably less time than 10 microseconds. It may be assumed that some 85 microseconds would represent the elapsed time from peak to peak of the counting pulses, although such a cadence is merely suggested by way of example.

Referring again to the above given table of four conditions in which binary digits are to be compared, it will be noted that the preliminary potential applied to the left-hand grid of tube 701 (the same as junction point $D_0$) is 0 v. either when the two digits are "0" or when they are both "1." This grid potential renders the left-hand triode section conductive and without appreciable grid current. The rise of potential at point $C_0$ by some 40 volts when tube 706 is triggered has no appreciable effect upon tube 701 because its left side is already conducting. No effect is wanted.

Now consider the effect of transmitting a negative spike through capacitor 711 some 40 microseconds later; that is, when tube 706 is restored to normal. Assuming that this spike has a value of −40 volts when it reaches point $C_0$, it should drop the grid potential ($D_0$) from 0 to −20 volts, which is sufficient to block the left section of tube 701. Accordingly the anode voltage ($E_0$) will rise sufficiently to generate a control signal through capacitor 713 and cause the right-hand section to become conductive. It is here properly assumed that the voltage swing of the left-hand anode is quite capable of delivering a signal pulse of such magnitude as to overcome the −30 v. bias on the right-hand grid. This being the case, the anode potential of the right-hand section ($F_0$) will drop sufficiently to pass a −40 volt signal through capacitor 714 and along to point $C_1$ which bears the same relation to tube 702 as does point $C_0$ with respect to tube 701. Hence the same process of testing each binary term is repeated, stage by stage of the concatenated tubes 701, 702, 703, etc. If the preparatory potentials applied to the left-hand grid of any of these tubes indicate a lack of agreement between the binary digits of the two numbers to be compared, then the phase inverter section of that tube will fail to pass along the testing signal. Hence the test for coincidence will fail for each and every count except the one which is desired.

The conditions which prevail when the preparatory input potentials show a lack of coincidence between two digits that are to be compared will now be explained.

When the digits are "0" and "1" for the keyed index and the binary count respectively, point $C_0$ stands at +100 v. and point $D_0$ at −25 v. The signal coming from tube 706 is first +40 v., then −40 v. as applied to point $C_0$. The positive spike has the effect of momentarily driving the left triode section of tube 701 conductive. The reduced anode potential at point $E_0$ exerts no control over the already blocked right-hand triode section of the tube. Near the start of the 40 microsecond delay period of tube 706 the potential at point $D_0$ will settle back to −25 v. which again restores the left section of tube 701 to nonconductance.

Now the negative spike of the test signal as applied to point $C_0$ is itself −40 v. and is reduced in value to −20 v. at point $D_0$. This potential only drives the left-hand grid from one cut-off value to an even lower cut-off value. Hence no surge impulse will pass through capacitor 713 to the right-hand grid. The phase inverter section fails to conduct and the coincidence signal is thereupon lost, as it should be.

The lack of coincidence is also shown when the digits are "1" and "0" for the keyed index and the binary count respectively. In this case, referring again to the above given table, point $C_0$ stands at +200 v. and the potential at point $D_0$ while nominally +25 v., would be reduced to substantially 0 v. because of grid current.

First, the negative spike of +40 v. applied to point $C_0$ drops to substantially +20 v. at point $D_0$ and this potential added to the preliminary value of 0 v. will not appreciably lower the anode potential in the left section of tube 701 because this section was already conductive. Furthermore, a large part of this transient signal voltage would be dissipated in grid current of increased amplitude.

Finally the negative spike of the test signal (−40 v. at point $C_0$ and −20 v. at point $D_0$) has no appreciable effect upon the anode potential in the left section of tube 701, since up to this time the grid was drawing current and the imposition of the −40 v. pulse only results in a reduction of the grid current. In other words, if the preparatory bias is +25 v. with tube 701 removed, and 0 v. due to grid current, then a negative pulse of −20 v. is not sufficient to stop the grid current and the left triode of tube 701 will not be blocked for transmission of the coincidence signal. It is apparent, therefore, that under both of the conditions of testing for lack of coincidence of the two binary digits no transfer of the test signal from stage to stage is possible.

The right-hand triode section in each tube 701, 702, etc., operates as an amplifier, an inverter and a wave shaper. When it is driven conductive by the test signal this action takes place pursuant to the finding of coincidence for that particular digit of the binary numbers and in order that a like test may be made with respect to successive digits of progressively higher orders. Only when coincidence is found will there be any output pulse (considering the right side of tube 701) delivered from point $F_0$ through capacitor 714 to point $C_1$. This is a test spike which is always negative and it controls tube 702 in the same manner as the negative spike applied at point $C_0$ for control of tube 701. The test spike, when it occurs, applies its stage-to-stage control at a time which is about midway between moments of progression of the binary counting chain from one binary expression to another.

A pentode tube 704 takes the place of the phase inverter section following the comparator triode of the highest digital order. The anode of that triode is coupled through capacitor 712 to the first grid of said pentode, this same grid being resistively connected to a biasing source of, say, −8 v. The cathode of tube 704 is grounded, and its anode is resistively connected to the +250 v. source. The screen grid potential is subject to the gating action of a cathode follower tube 705 to the cathode of which it is connected.

I have already described the delay circuit 708 and its mode of operation. Except for its time constant for self-restoration to a conductive state in the left-hand triode section (it being a twin triode) the delay circuit 708 may be understood to be the same as that which includes tube 706. Its left-hand anode is resistively connected to the grid of tube 705 and to the bias resistor therefor. Tube 705 has a cathode resistor through which there is a considerable potential drop when this tube is rendered conductive; that is, during the 10-microsecond gating period which results from the triggering of tube 708. Hence I utilize this potential drop to raise the screen grid potential in 704 sufficiently to gate the coincidence pulse into the output conductor 707, and thence through capacitors 624 and 625 in parallel (Fig. 6) for the control of tubes 601 and 602 respectively, as will presently be explained. The operation of the coincidence circuit should be clearly understood in view of the foregoing description.

THE READING GATE PULSE GENERATOR

Figure 6:
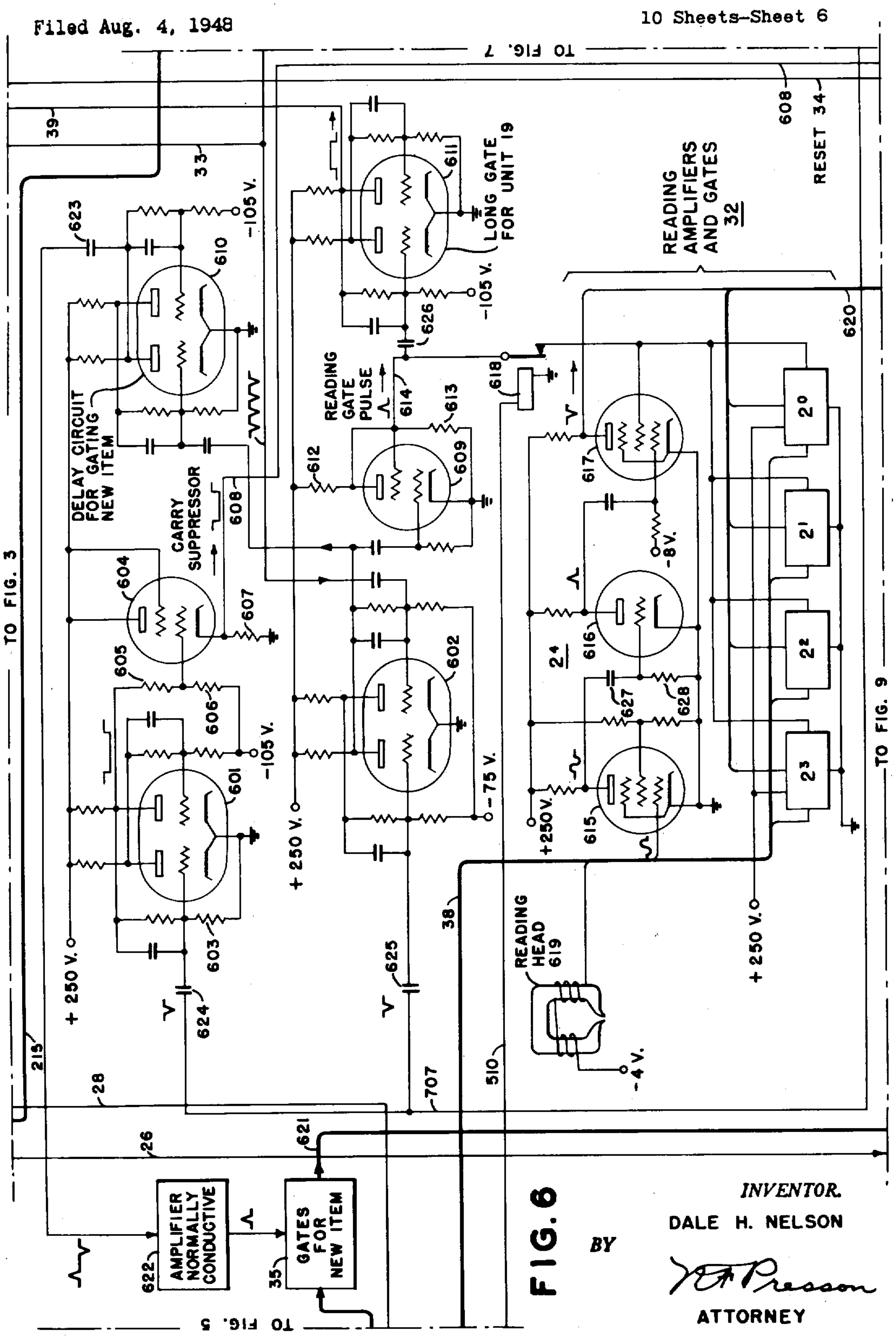

This pulse generator and certain associated circuits are shown in Fig. 6. The two twin triode tubes 601 and 602 have their left-hand grids capacitively coupled to conductor 707 through which they receive a single negative pulse at the instant when the coincidence unit 16 has functioned. These tubes are provided with cross connections between the grids and anodes of their triode sections. Tube 601 is normally biased to cut-off on the right side by a biasing source of, say −105 volts applied to the right-hand grid. The left-hand grid is grounded through resistor 603, thus holding the left-side conductive until a negative pulse is received from the coincidence unit through conductor 707. The circuit parameters of tube 601 are so adjusted as to hold it in a triggered state (right side conductive) during a time interval which spans a read-out operation, and then it is automatically restored by the negative bias potential on its right-hand grid.

During the read-out operation it is necessary to disable the carry circuits in the computer unit 17. This is done by blocking certain tubes of the carry circuits through the application of a low screen grid potential thereto. For this purpose tube 601 in its triggered state (right side conductive) causes a cathode follower tube 604 to be blocked. The grid of tube 604 is driven negative and stops the current flow through cathode resistor 607, thus reducing the screen grid potential of said carry circuit tubes to a blocking value, as may be seen by tracing conductor 608 from the cathode of tube 604 to the screen grids of tube 108 and similar tubes in carry pulse circuits 109 to 112 inclusive.

Tube 602 operates as a straight flip-flop unit. The right section is blocked or held blocked by every gated negative pulse applied to its grid over conductor 33 from the counting pulse gate 30. Hence the left section is normally conductive and is prepared to be triggered by the negative pulse applied to its grid over conductor 707 from the coincidence unit. The triggering pulse blocks the left section of tube 602 only until the right section is triggered by the next ensuing counting pulse which is received over conductor 33 and which is the effective timing pulse for gating the reading circuits.

Tubes 609 and 610 are both controlled by the differentiation of the pulse which results from the reduction of anode potential in the left section of tube 602. This pulse is applied negatively to the input circuit of tube 609 and blocks the same during the brief interval necessary to gate the reading amplifiers for the several digits of the recorded inventory balance.

Tube 609 is preferably a tetrode having its anode and screen grid interconnected, and therefore operative as a triode. The anode potential is supplied through a resistor 612. Resistor 613 is a load which is effectively in shunt with the space paths of tube 609 and of several reading gate tubes such as tube 617. Conductor 614 normally delivers a gating pulse to the screen grids of tube 617 and similar tubes for the purpose of gating the output from each reading amplifier (individual to the respective binary digits) to the Storage and Computing Unit 17.

Tube 610 operates under control of tube 602 for the purpose of gating the new item into the computer, as will be explained in due course.

THE READING AMPLIFIERS AND GATES

In the instant embodiment of my invention the magnetic data storage device is arranged for the recording of the several digits of a binary number in separate paths so that by the use of reading and recording heads individual to each path it is possible to read out or to record any item in one instant of gating. In accordance with another arrangement the several digits of a binary number would be recorded or read sequentially by scanning a single path. The space factor involved in allotting separate items to their proper places on the recording medium would be the same in either case. My preferred method, as herein shown, requires the same number of reading and recording heads as the other method, the spatial capacity for storing information being the same in the two cases. My method also has the advantage of using a simpler gating technique, since one gating pulse can be simultaneously applied to each separate reading or recording circuit for the several digits of the number in contrast with sequential gating.

In Fig. 6 I have shown in detail a preferred amplifier and gating circuit for reading one digit $2^4$ of a binary number. Similar circuits will be understood to be included in the blocks $2^3$, $2^2$, $2^1$ and $2^0$. The circuits as shown may be modified in certain respects, but the aim of this disclosure is to outline a novel and workable system for carrying out the objects of the invention. Matters of alternative circuit design are, therefore, left to the choices of those skilled in the art, using the present circuit arrangement as a typical example.

Each of the digital amplifiers comprises three stages, of which tube 615 is a pentode taking its control directly from one of the reading heads in the magnetic storage device 9. The triode tube 616 is in the second stage and functions as a differentiator and amplifier. Tube 617 is a pentode having its first grid under control of output pulses from tube 616 and its screen grid is connected to the gating bus 614 which brings in the gating pulses from tube 609 in phase with positive pulses from tube 616.

All of the reading and recording heads are, of course, included as components of the magnetic storage device 9. Their circuits are closed selectively for any group of items which are spread linearly along paths chosen by the group selector keys 201. The gang relays 13 make this group selection. To meet the requirements for the storage of any numerical item from "0" up to 31 five binary digits are necessary. Therefore each group relay in the unit 13 has five pairs of contacts for the reading circuits, and ten pairs of contacts for the recording circuits, the latter being required for distinguishing between recording pulses of "0" and "1" significance respectively.

The five conductors from the gang relay unit 13 which are connectable to group-selected reading heads are bundled in cable 38 and are individually connected to the first grid of tube 615 and to the first grid of corresponding tubes in the reading amplifiers $2^3$, $2^2$, $2^1$ and $2^0$. In order to indicate more clearly the cooperation between a reading head and the amplifier which it controls I have made a conventional showing of an electromagnetic pick-up element 619 having its winding connected between a —4 volt biasing source and the control grid of tube 615. It should be understood, however, that the unit 619 is, like the others of which it is typical, one of the components of the magnetic storage unit 9 and that its circuit also extends through a gang relay of group 13, although not shown that way on the drawing.

During the time of closure of a gang relay 13 (between one and two revolutions of the rotor in unit 9) the amplifier tube 615, and corresponding tubes of other digital orders, will respond to the scanning action of the reading heads and amplify the reading pulses generated by every item that has been recorded on the recording tracks of the selected group. These pulses are constituted as single sine waves, the leading and trailing slopes of which are not utilized. However, the slope of the wave between peaks of opposite polarity may be considered as going more positive to represent the binary number "1" and more negative to represent the binary number "0."

Under these conditions and at the instant of transition from the first to the second semicycle of each said single sine wave, a differentiating action takes place in the circuit which includes capacitor 627 and resistor 628. The grid of tube 616 is connected to the junction between said capacitor and resistor. Tube 616 is normally conductive and becomes blocked when the differentiating pulse is negative. But a positive pulse produces no appreciable effect on tube 616, since it is already conducting.

The pentode tube 617 is jointly controlled by the action of tubes 616 and 609. Positive pulses must be delivered simultaneously to the first and second grids of tube 617 in order to render it conductive, since normally this tube has blocking biases applied to its first and second grids. Tube 609 operates at a time selected by the indexing action of the coincidence circuit (as hereinabove explained) so that during a single revolution of the rotor in the magnetic storage unit 9 only a single positive gate pulse is delivered to the screen grids of tube 617 and the like for the respective digits of the binary number. The anode of tube 617 is connected to a utilization circuit through a conductor in cable 620. Tube 617 delivers a negative pulse to this circuit only if "1" is read, otherwise there is no response.

The reading of the selected item as above -described in connection with the Reading Amplifiers and Gates 32 has the following effects: Negative control pulses are delivered through utilization circuits which are bundled in cable 620 and carried through capacitors 113 to separate input circuits of flip-flop tubes 101 to 105 inclusive in the storage and computing unit 17 (Fig. 10). Such pulses are transmitted only when the number "1" has been read from the record. Number "0" is indicated by the absence of a pulse.

THE STORAGE AND COMPUTING UNIT

In Fig. 10 I show more in detail the components of a storage and computing unit 17 which is represented as a single block in Fig. 1. This unit comprises a twin triode flip-flop stage for each digit of the binary numbers to be dealt with. Tubes 101 to 105 inclusive are similar and have like circuit connections. They represent the digits $2^0$, $2^1$, $2^2$, $2^3$ and $2^4$ respectively, and will, therefore handle numbers from 0 up to 31. The addition of more stages would, of course, increase the capacity of the system, but without involving any different principles of operation.

Tubes 106, 107 and 108 are constituted as a carry circuit operable either for subtractive or for additive carrying of pulses from digit $2^0$ to digit $2^1$. Blocks 109, 110, 111 and 112 are similar carry circuits, each interposed between one digit-representing flip-flop stage and another of next higher order. During the read-out of numbers from magnetic storage device 9 it is necessary to suppress all carry pulses. This necessity was referred to in connection with the foregoing description of tubes 601 and 604, where it was stated that the momentary blocking of tube 604 during a read-out operation causes the potential in conductor 608 to be reduced substantially to that of ground so that tube 108 and tubes in the other carry circuits having the same function are disabled until after the unit 17 has been set to store the digits of the number transferred thereto by the reading amplifiers.

The read-out of the current inventory balance from the magnetic storage unit for transfer to the computer 17 is an operation which is directed by the setting of any one of the keys "Q," 206 or 205 singly, but not when keys 205 and "R" are both set. In the latter case the system is required to record a new item in place of an old item that is to be deleted.

The circuit arrangements for computer tubes 101 to 105 inclusive are conventional in that the anode of each triode section is coupled through a parallel resistor and capacitor to the control grid of the other triode section. The control grids are negatively biased by a source of say −75 volts with respect to ground. Resistor 116 is common to both biasing circuits while resistors 114 and 115 are individual to the grids of the left and right triode sections respectively.

The cathode in the left-hand triode section *a* of each computer tube is directly grounded. The cathode in the right-hand triode section *b* of each computer tube is connected to the reset bus 34 and is normally held at close to ground potential, since the cathode resistor 331 of the reset tube 304 has no appreciable potential drop therein except during the brief moment when the reset tube responds to a start pulse. At such time the cathode potential in section *b* of each computer tube is driven positive and causes this section to be blocked, so that a subsequently applied negative pulse representing the read-out of "1" from the magnetic storage unit 9 will always be responded to by section *a* of the computer tubes and cause the conductive state to flip from section *a* to section *b*. If no reading pulse is received then section *a* will remain conductive to indicate "0" as the reading of any particular digit.

A glow discharge tube 119 is connected in shunt with the space path of section *a* in tube 101. Similar tubes 119 will be understood to be connected in the same way with reference to the computer tubes 102 to 105 inclusive, although purposely omitted from the drawing for space economy reasons. These tubes 119 serve as indicators of the binary number as stored in the computer at all times. Tubes 119 are serviceable for maintenance and supervisory purposes, but do not otherwise contribute to the practical operation of the system.

It was mentioned above that a reset pulse is generated by tube 304 in response to the reception of the start pulse. The reset pulse is applied through bus 34 to the cathodes in the right-hand section of each of the computer flip-flop tubes 101 to 105 inclusive and prepares these tubes for reception of the read-out pulses by first shifting the conductive state to the left section *a*. The reset pulse is of sufficient duration to over-ride any unwanted carry circuit effects that might otherwise result in a failure of tubes 101–105 to settle down with their left sides conductive prior to the start of a computation.

Now when the reading amplifiers are gated to inject negative pulses into the computer unit to indicate a reading of "1" from the magnetic storage unit, those of the flip-flop tubes 101–105 in which "1" is to be stored will be rendered conductive in their right-hand sections *b*, and the others will remain conductive in sections *a* to register "0." This operation takes place while the carry pulse suppressor circuit 608 is held at close to ground potential (as has been explained above), and hence none of the tubes 102–105 will be triggered by carry pulses. Of course, no carry pulses would occur at the time of a read-out from magnetic storage if the intended operation is to add a new item to the current balance. But if the operation director 7 is set either for Inquiry or for Subtraction, then the effect of the read-out from storage would be to subtract the item of the current balance from zero, and obviously this would involve the operation of the carry circuits in order to bring out a negative result, which would not be wanted when introducing the minuend. From this it will be seen that the carry suppressor circuit operates during the read-out from storage in order to avoid consideration at that time of the question whether the computer is subsequently to perform an operation of addition or of subtraction, since the carry circuits must be set to perform differently in the two cases.

GATING THE NEW ITEM INTO THE COMPUTER

The new item as set up on the keyset keys of group 203 is transferred to the decimal-to-binary converter unit 8 immediately upon closure of gang relay 4 or 5. Unit 8 is preferably of the relay type similar to unit 6, although, if desired, either or both of these converters could be so designed as to substitute storage tubes for electromagnetic relays, as will be clear to those skilled in the art.

Unit 8 comprises pyramidal arrangements of relay contacts similar to those of unit 6, and an output circuit for each digit of the binary number representing the new item. Each pyramidal apex is supplied with a suitable potential for resistive coupling of the output circuit to the control grid of a pentode tube in a gate unit 35 (Fig. 6). Details of unit 35 are not shown since it will be clear that the gating action can be performed in the same manner as has been described in connection with the read-out from magnetic storage. It will be understood, therefore, that for each binary digit of the new item a tube such as 617 is included in unit 35. The screen grids of the gating tubes are normally held at a relatively low potential in order to make them nonconductive. These tubes are also normally biased to cut-off except as they are controlled by a positive potential applied from unit 8 to their control grids to represent "1" in the binary number.

Unit 35 is caused to function at a moment which is determined by a delay circuit comprising twin triode tube 610, this tube being triggered by a negative output pulse from tube 602 on reception of the first counting pulse which follows the primer pulse from the coincidence unit 16, as has already been described. Tube 610 has its right-hand triode section normally biased to cut-off, so that upon reception of a negative pulse applied to its left-hand grid it will be triggered, but will be automatically restored to its normally left side conductance after a suitable delay for which its parameters are designed.

The output from tube 610 is delivered to a normally conductive amplifier 622 through a coupling capacitor 623. This output is first a positive pulse caused by the triggering action of tube 610 when its left-hand section is blocked. The positive pulse has no effect on the amplifier 622 because it is already conductive. Then follows a negative pulse (with fixed delay) which blocks the amplifier 622 and causes a positive pulse to be delivered to each of the screen grids of the gating tubes for different digital circuits in the unit 35. All such tubes as have been primed by a positive bias on their control grids, as obtained when "1" is indicated by the binary converter 8, are now driven conductive momentarily, and thus transmit negative pulses to the computer 17 through separate circuits in cable 621. These pulses are used to control and to trigger respectively different digital flip-flop tubes 101–105. Through capacitors 117 the control is applied either to the grid of section *a* or of section *b*, depending upon the conductance of the left or right side of each tube. In either case the pulse produces a triggering action because only the conductive section of the flip-flop tube responds to a negative pulse. So far as the injection of the pulses into the separate digital computer tubes is concerned the action is just the same whether the operation is to result in obtaining a sum or a difference. It is by suitable control of the carry circuits that the computer is enabled to add or to subtract at will.

THE CARRY CIRCUITS

Addition will first be described. When key 205 is set it operates relay 503 in the operation director unit 7. This relay has three functions, as previously explained. We are now concerned only with the control of the carry circuits. Two of the movable contacts of relay 503 and their associated stationary contacts operate as a reversing switch. When relay 503 is not operated two D. C. sources of +200 v. and +100 v. are applied respectively to conductors 507 and 508 leading to the carry circuits in the computer 17. This condition is obtained for subtraction. For addition relay 503 is operated and the +200 v. and +100 v. potentials are applied to conductors 508 and 507 respectively.

Referring again to Fig. 10, the carry pulse circuit which controls tube 102 (for digit $2^1$) when tube 101 (for digit $2^0$) adds 1+1 includes tubes 106, 107 and 108 and their associated terminal connections. This circuit arrangement is typical of others 109 to 112 inclusive which intervene between different digital stages of the computer.

Tube 106 is a twin triode having its anodes coupled respectively through capacitors 121 and 122 to the anodes of sections *b* and *a* in tube 101. These anodes of tube 106 are normally maintained at ground potential by connection through resistors 120 to ground. The cathodes of tube 106 are grounded through a common cathode resistor 123. The control grid of section *c* is connected to a junction between two resistors 124 and 125, where the other terminals of these resistors are connected respectively to a −100 volt source and to conductor 508. The control grid of section *d* has corresponding connections to the −100 v. source and to conductor 507, a second resistor 124 and resistor 126 being used for this purpose.

Resistors 124, 125 and 126 are of chosen values such that when relay 503 is operated for performing addition the control grid in section *c* of tube 106 will be biased at a positive potential with respect to the grounded cathode, and anode. At the same time the cathode and anode of section *d* will both be at ground potential and the control grid will be negatively biased. Hence this section will be inactive when adding operations are performed.

When "1" is registered in tube 101 by a read-out pulse this tube becomes conductive in section *b*. At this time there is no influence upon tube 106, since a negative pulse applied through capacitor 121 merely drives the anode potential of section *c* negative with respect to ground, while a positive pulse applied through capacitor 122 to the anode in section *d* will not render this section conductive because it has been biased to cut-off.

If "0" is registered in tube 101, as when there is no read-out pulse applied thereto, section *a* remains conductive, the same as when it received the reset pulse. When the new item (assuming its binary term $2^0$ to be "1") is gated into the computer from the code converter 8, tube 101 will be triggered by a negative pulse representing "1" in the lowest order of binary digits, $2^0$. This being the first triggering pulse after tube 101 received its reset pulse, no carry pulse is called for and tube 106 will remain unresponsive, the same as explained in the preceding paragraph. Likewise no carry pulse is called for if tube 101 has registered "1" in the read-out operation but receives no "1" signal from the gating of the new item.

Now observe the control of tube 106, when "1" is added to "1" by two successive triggerings of tube 101. The read-out signal renders triode section *b* conductive and drives the anode of section *c* more negative. No carry pulse. Then the new item signal "1" renders triode section *b* nonconductive and causes a positive surge pulse to traverse capacitor 121 with the result that section *c* of tube 106 is made conductive. Either section of tube 106 acts as a cathode follower when so influenced. A positive pulse is then applied through capacitor 127 to the control grid of section *e* in a twin triode tube 107. This tube has suitable circuit parameters for enabling it to operate as a single-cycle delay circuit with automatic reset, like other delay circuit tubes hereinabove described. The purpose of introducing a delay in the carry circuit is to avoid the application of a carry pulse to a computer tube while it is being triggered by a signal from the binary converter 8.

The time constant for automatic restoration of tube 107 and the like to the normally blocked state of its section *e* is so chosen that all carry pulses will be delivered by each digital computer stage to one of higher order before the result of the computation is sought to be utilized. This is true even when one carry pulse produces a succession of further carry pulses affecting digits of higher order, as may at times happen.

Tube 108 is here shown as a tetrode for example. Its cathode is grounded; its anode is supplied with a suitably high potential through resistor 130; its screen grid is normally maintained at a high potential through the previously mentioned carry suppressor conductor 608; and its control grid is connected to a negative biasing source of, say, −30 v. through resistor 129. This control grid is also coupled through capacitor 128 to the anode in section *e* of tube 107.

It will be understood from the foregoing and by reference to Fig. 10 that tube 108 serves to transmit a negative pulse through capacitor 131 to tube 102 (for digit $2^1$) when tube 108 is rendered conductive by a positive surge impulse through capacitor 128. This is at the instant when the anode in section *e* of tube 107 is driven positive, that is, when tube 107 recovers its normal stability after being triggered. This action takes place in a similar manner between other digital stages of the computer wherever any of the tubes 102–105 has been triggered for the second time. The second triggering pulse may be the result of receiving a "1" signal from the gating of the new item, "1" having been previously registered in the read-out process. Or the second triggering pulse may be a carry pulse from a lower order of the digital stages when "1" was previously registered during the read-out process or at the time of gating the new item.

When the computer 17 is set for subtraction of the new item from the number as derived from the read-out of the currently stored inventory balance the carry circuits are arranged to "borrow" from a higher digital order.

For subtraction either of the keys Q or 206 in the keyset may be actuated, thereby to operate relay 501 in the one case, or relay 502 in the other case. The Q key is used for interrogation and calls for a result indication without disturbing the balance in the magnetically recorded inventory. Key 206 calls for the recording of a new inventory balance after subtracting the new item from the balance transiently stored in the computer, but only when the result of the subtraction is positive. The answer-back indication posted either on the "OK" lamp or the "No" lamp of indicator 25 is also a concomitant operation following the use of any of the operation director keys.

Since relay 503 is not operated for performing subtraction, the potentials applied to conductors 507 and 508 are +200 v. +100 v. respectively. Hence the right-hand triode section *d* of each tube 106 and the like in the carry circuits of the computer will be sensitive to carry pulses. The carry circuits are required to "borrow" 1 from a higher digital order when the computer attempts to subtract 1 from 0. This condition arises when the signal for 1 representing a digit of the new item is applied, for example, to tube 101 while it stands with its triode section *a* conductive, that is, while it registers 0. The new item signals, it will be remembered, are transmitted from the code converter unit 8 over conductors of cable 621 and through capacitors 117 to the two input circuits of each computer tube 101, 102, 103, etc.

The carry pulse incident to the subtraction of 1 from 0 is produced by triggering tube 101 under the condition set forth in the preceding paragraph. The anode in section *a* rises in potential when this section is blocked by the input signal. Therefore a positive pulse is transmitted through capacitor 122 to the anode of section *d* in tube 106. A potential drop occurs in the cathode resistor 123 which causes the carry pulse to be forwarded through capacitor 127 for triggering the delay circuit tube 107, the same as has been described in reference to carry circuit operation for addition. At the end of the delay period obtained by restoration to normal of tube 107, tube 108 is actuated, as previously described. Tube 102 is triggered from one stable state to the other, regardless of the state previously held. If such state indicated 1, then the "borrowing" step would be terminated in that stage; otherwise the borrowing operation would be continued from stage to stage until a 1 was found to be registered.

The carry circuits as used in subtraction do not operate under any condition other than as described above. This will be seen from the following table:

| Minuend | Subtrahend | Borrow |
|---|---|---|
| 0 | 1 | Yes. |
| 0 | 0 | No. |
| 1 | 1 | No. |
| 1 | 0 | No. |

THE NEGATIVE RESULT DEVICE

Computer 105 registers the binary digit $2^4$, the highest order for the range of numbers herein covered. If a carry pulse is delivered by this stage, then a carry pulse circuit 112 makes response by delivering a negative pulse to a negative result circuit 40, the purpose of which is to cause the transmission of an answer-back signal for producing a "No" indication in the indicator 25; and also for preventing the recording of a negative result in the magnetic storage device 9.

The negative result signal circuit 40 leads to a capacitor 808 through which a negative pulse may be applied to a flip-flop tube 18 for triggering the same. The circuit of tube 18 is similar to that of tube 401, for example, and need not be described in detail. Note, however, that its right-hand triode section has a cathode which is connected to the reset bus 34 so as to have this triode section rendered nonconductive prior to the start of a computing operation.

Tube 18 serves to store the negative result signal if it occurs. It controls a cathode follower tube 801 whose grid is connected to a junction point *j* in a voltage divider consisting of three resistors 809, 810 and 811, where resistors 809 and 811 are respectively connected to the +250 v. and −100 v. terminals and the anode in the right-hand section of tube 18 is connected to the junction between resistors 809 and 810. Tube 801 is normally conductive, but can be blocked by rendering the right-hand triode section of tube 18 conductive.

A pentode tube 802 is subject to joint control by application of suitable potentials to its screen grid and its control grid. The screen grid is connected to the cathode of tube 801 and thence through a cathode resistor 812 to ground. The control grid of tube 802 is normally biased to cut-off by application thereto of a bias potential of substantially −8 v. When no negative result signal is present to block tube 801, the potential drop through cathode resistor 812 is sufficient to maintain a relatively high working potential on the screen grid of tube 802. When so primed tube 802 is responsive to a positive pulse applied from the delayed action counting chain 19 (Fig. 4) through conductor 26 and capacitor 813 to the control grid, thus causing tube 802 to conduct and to deliver a negative output pulse through capacitor 814 to a tube 20 which is here shown as a tetrode, but with its screen grid directly connected to the anode so as to operate as a triode. The function of tube 20 will be explained when describing the operation of the recorder.

THE ANSWER-BACK SYSTEM

Tube 18 has a function additional to the one described above. The result signal transmitter 41 (Figs. 1 and 8) contains two thyratron tubes 805 and 806, one of which must be selectively primed for triggering in order to transmit an "OK" or "No" signal. The priming circuit includes two voltage dividers, one having resistors 818 and 819 which interconnect the right-hand anode of tube 18 and a biasing source terminal of −200 v. The other voltage divider has resistors 820 and 821 which interconnect the left hand anode of tube 18 and said −200 v. source terminal. The junction between resistors 818 and 819 is connected to the first grid of thyratron tube 805, while the junction between resistors 820 and 821 is connected to the first grid of thyratron tube 206.

The anodes of the two thyratron tubes are supplied with anode potential at source terminal 506 whenever one of the operation director relays 501, 502 or 503 is actuated, the anode circuit including conductor 509. The second grids of both thyratrons are subject to the gating action of a cathode follower tube 807 in response to the reception of the positive gating pulse from unit 19. Such a pulse traverses conductor 26, capacitor 822, and a resistor 823, the latter forming a connection between the control grid of tube 807 and the negative terminal of a −40 v. source.

Relay winding 824 interconnects the cathode of tube 805 and ground. Relay winding 825 similarly interconnects the cathode of tube 806 and ground. There are two conductors in cable 36 which are connected individually to make contacts on relays 824 and 825. These conductors are extended by closure of any one of the gang relays 4, 5 to lamps in an indicator 25 associated with an operated keyset. Accordingly, upon selective triggering of one of the thyratron tubes 805 or 806 the keyset operator is advised as to the result of a computation. The operation of the answer-back system is summarized as follows:

Assume that the new item is greater than the balance that was read out of the magnetic storage device 9 and entered into the computer 17. A negative result signal would be transmitted through conductor 40 to the input circuits of tube 18, causing it to shift its conductive state from left to right. The higher anode potential on the left-hand anode increases the potential drop through resistors 820 and 821, thereby rendering the first grid in tube 806 more positive. This tube does not immediately fire, however, but will do so on lifting its second grid potential in response to the application of the recording signal over conductor 26 and through capacitor 822 to the control grid of the cathode follower tube 807. When this occurs an increased potential drop through cathode resistor 826 provides the necessary unblocking of both thyratrons 805 and 806 for enabling that one of them to strike which was previously primed by the condition of tube 18. Since it was assumed that tube 806 would be thus primed the current flow through it will cause relay 825 to be actuated. Hence the "No" signal is transmitted to the "No" lamp in the indicator 25.

Assume that the new item when subtracted from the old balance in the computer gives a positive remainder. No "borrow" action will take place in the carry pulse circuit 112 (Fig. 10). No negative result signal will be delivered to tube 18. The stable state of conductance on the left side of this tube will remain as given by the reset signal. The higher anode potential on the right side produces a sufficient potential drop through resistors 818 and 819 so that tube 805 is primed for triggering when tube 807 is rendered conductive in response to the recording signal. At this time tube 805 will fire and operate relay 824. This relay closes the answer-back circuit which causes an "OK" signal to be transmitted to the indicator 25. The requirements of the answer-back system being thus satisfied, the circuit is opened by release of the gang relay 4 or 5, although the lighted lamp in the indicator may thereafter remain lit at the discretion of the operator, being provided with a local locking circuit as shown in the aforementioned Schmidt application. And when the common equipment is released from control at the operated keyset the relay in the operation director unit 7 which was actuated now releases and removes the anode potential from the thyratrons 805 and 806. Hence the answer-back system is restored to normal. It should be noted that the answer-back signal "OK" is given after operating the computer for addition. This indicates that the system has not failed to function.

THE DELAYED-ACTION COUNTING CHAIN 19

This counting chain, as shown in the lower part of Fig. 4, counts eight of the pulses which are delivered by the counting pulse bus 33 through a long gate 406. The Components of the counting chain are of the same type as those of the above described counting chain 14, but fewer stages are required, and there is no need for output circuits from intermediate stages. The mode of operation of the flip-flop circuits is exactly the same as in the counting chain 14.

Figure 3:
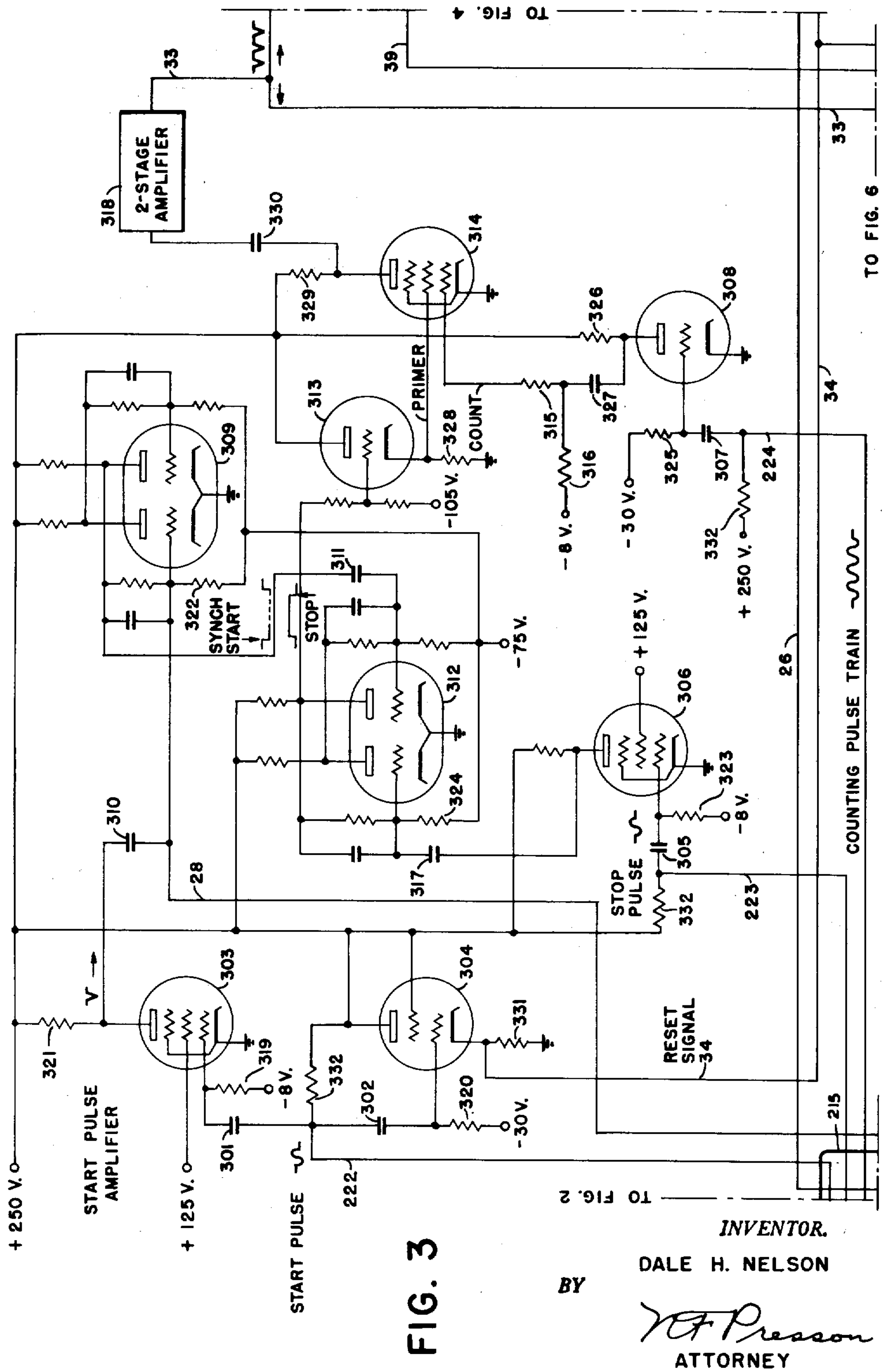

The long gate 406 is represented by a block because it is preferably composed of tube stages such as tubes 308, 313 and 314, and such a long gate has already been described and shown in Fig. 3. The gate has a timing action which permits somewhat more than eight pulses to be passed to the counting chain but never more than fifteen pulses, because multiples of the eighth pulse would cause unwanted output signals to be injected into the recording gate pulse line 26. So the timing of the gate 406 for passing the counting pulses is fixed by the circuit parameters of tube 611 and the count is started at the instant when the reading gate generator 609 delivers a positive pulse through capacitor 626. The effect of this pulse is to trigger the one-cycle multivibrator tube 611, the characteristics of which are the same as others of this type already described. In this case the left triode section is normally blocked so as to be sensitive to the positive pulse from the reading gate generator. When triggered the conductive state is shifted from right to left, thereby causing the potential of the right-hand anode and of conductor 39 to be raised. This condition is maintained for a period of ten or twelve counting pulses and is ended when tube 611 restores itself to normal, the circuit parameters being suitably chosen for this timing.

Assuming now that a cathode follower tube like 313 is a component of the long gate 406, it will be apparent that this tube may be rendered conductive during said period of ten or twelve counting pulses. Then a primer potential is applied to the screen grid of a pentode tube similar to 314 and conditions the same to transmit counting pulses by variations of its anode potential. The duplicate of tube 314 in gate 406 may have its control grid coupled to the output circuit of a phase inverter tube like 308, which of itself would be receptive to negative counting pulses applied to its control grid and would deliver positive pulses from its anode to the control grid of said duplicate of tube 314. From this explanation the mode of operation of the long gate should be readily understood. It will also be apparent that at least eight but not more than fifteen negative counting pulses will be delivered through capacitor 407 to the input circuit of tube 408 which registers the count in the $2^0$ order of binary digits.

The four tubes in counting chain 19 (for digits $2^0$, $2^1$, $2^2$, $2^3$ respectively), are suitably connected in flip-flop circuits for obtaining a binary number representation which progresses until the tube representing the $2^3$ digit registers "1"; that is, the 8th count. Before gating the counting pulses to the counting chain the reset pulse is applied by the reset bus 34 to the right-hand cathode in each flip-flop tube, thus providing a zero registration in each digital stage. Hence, the utilization circuit 26, which is connected to the left-hand anode in the tube stage for digit $2^3$ receives a positive pulse at the instant of the 8th count following the counting pulse which initiated the reading operation. One use which is made of the 8th count signal through conductor 26 has already been referred to in connection with the control of a cathode follower tube 807, where this tube when made conductive causes one of the thyratron tubes 805 or 806 to be fired and to develop an answer-back signal. Another use of the 8th count pulse is to properly time a recording operation so that the result of a computation may be sent back to the magnetic storage device, as will now be explained. I shall also explain the recording of a new item.

THE RECORDING GATES AND AMPLIFIERS—21

Figure 9:
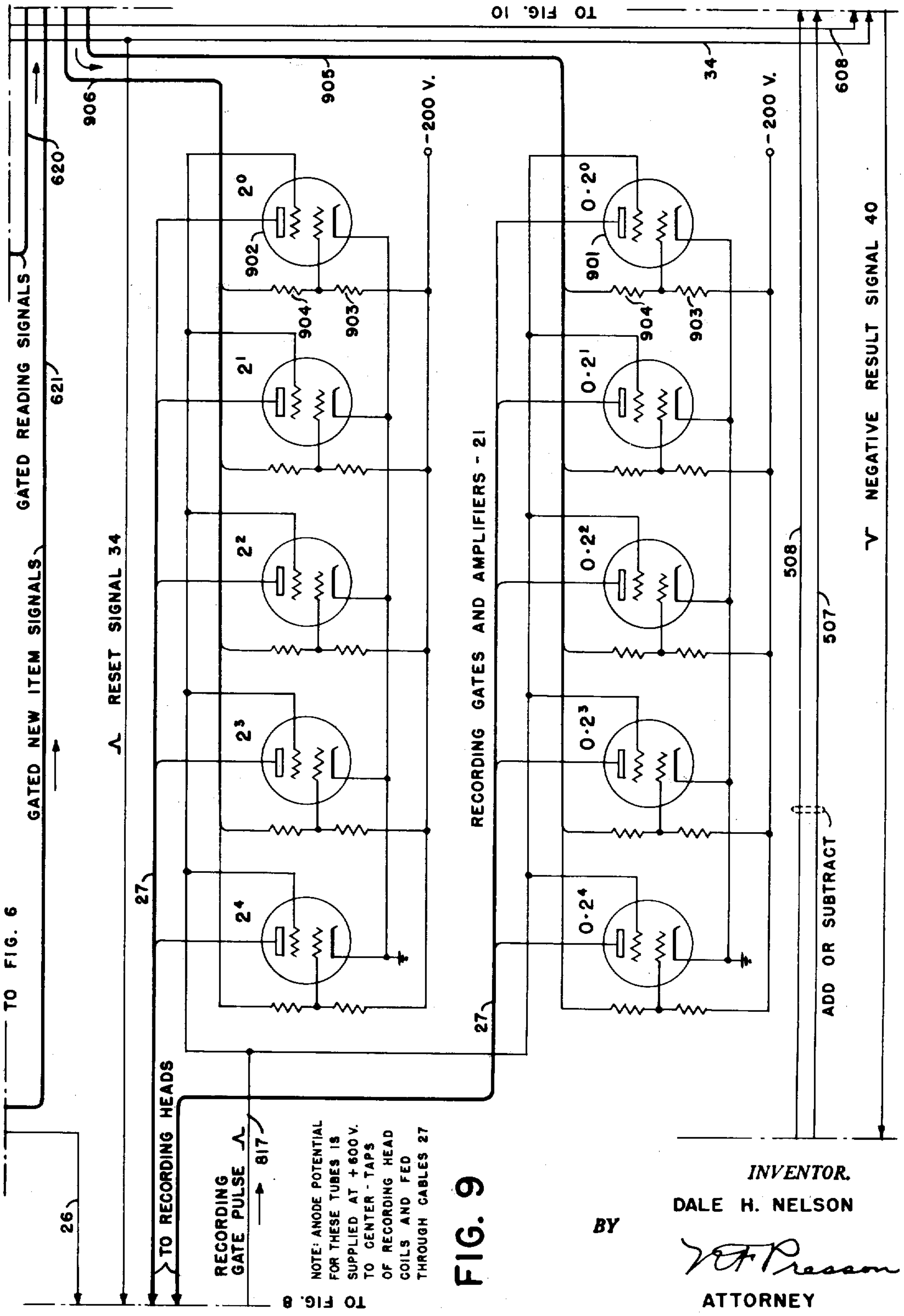

Block 21 in Fig. 1 is labeled "Recording Gates and Amplifiers." Fig. 9 shows this unit more in detail. For the instantly disclosed embodiment of my invention each of five binary digits of the number to be recorded is stored as a priming potential on the first grid of a tetrode tube in the lower row of the circuit arrangement of Fig. 9 if the digit happens to be "0" and in the upper row if it happens to be "1." These tubes are labeled according to the digital order which they represent, that is, $2^0$ to $2^4$ inclusive.

The first grid in each of the tubes such as 901 and 902 is connected to a junction between two resistors 903 and 904 where the other extremities of these resistors are connected respectively to a —200 v. source and to conductors in cables 905 and 906. In cable 905 there are five conductors each connected to the anode of section *b* in a separate one of the computer tubes 101 to 105 inclusive. In cable 906 the five conductors are similarly connected each to the anode of section *a* in a separate one of the same computer tubes.

When one of the computer tubes registers "0" the high anode potential of its section *b* primes the first grid of a corresponding 0—representing amplifier tube 901 to become conductive at the instant when a positive pulse is applied to the screen grid of the same amplifier tube from the recording gate pulse generator 20. The utilization circuit through capacitor 803 and conductor 817 is arranged to function at that instant. It serves all of the tubes 901 and 902. A computer tube which registers "1" has a high anode potential on the anode of its section *a* and therefore primes the associated amplifier tube 902 to become conductive on reception of the gating pulse.

From the last three preceding paragraphs it will be seen that for each digital order of the binary number that has been registered in the computer 17 a tube 901 or a tube 902 will be primed for action, depending upon whether "0" or "1" is to be recorded. Therefore a permutational selection of five of the ten recording amplifier tubes will be activated by the gating pulse. A pair of these tubes is associated with each recording head in the magnetic storage device 9. The recording heads are not shown because they may be of any conventional type, providing that they possess a center-tapped winding with outer terminals having a connection to appropriate conductors in the two cables 27. The center tap is preferably connected to the positive terminal of a 600 v. source, the negative terminal being grounded.

The application of a gating pulse through conductor 817 to the second grids of tubes 901 and/or 902, the potential of the first grids having been adjusted by the standing of the computer tubes, causes one or the other of the two recording head coils to be energized, depending upon the north-south orientation of spot magnetization which is required to record a "0" or a "1." The timing of the recording gate pulse so as to obtain an 8-count delay with respect to the reading gate pulse is a factor which determines the spatial relationship between a reading head and a recording head, both of which are assigned to the same record track. Hence the recording of a new item, or a new inventory balance is always superimposed on the item record of the selected category. And the magnetizing force of either one of the two halves of the recording head winding is sufficient to obliterate an opposingly oriented spot of magnetization.

UTILIZATION OF RELAY 501 FOR INTERROGATION ONLY

Figure 8:
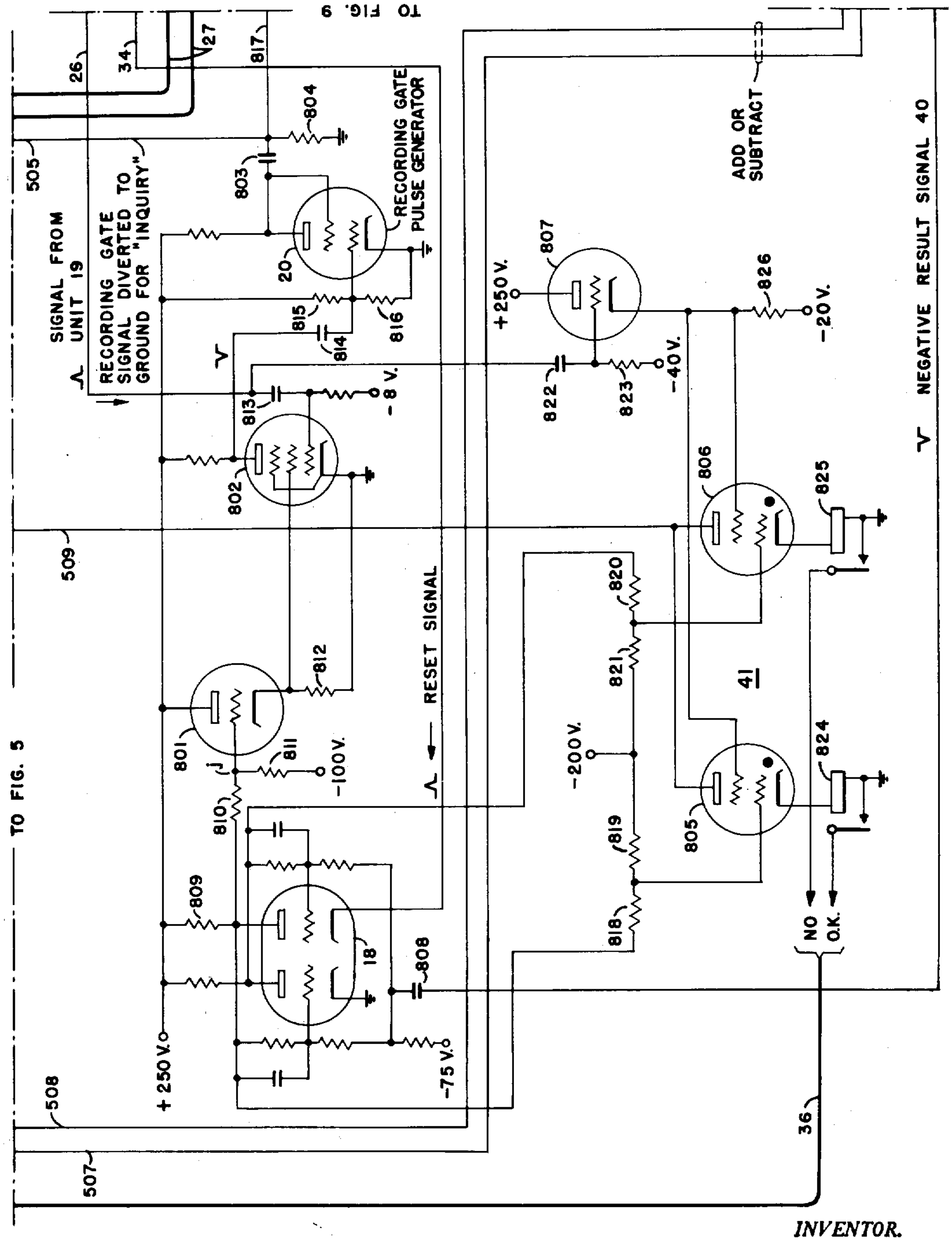

Referring to Figs. 5 and 8 it will be observed that when the operation director relay 501 is actuated, that is, for interrogation of the record of any selected item, a ground connection is established through conductor 505 to the junction between capacitor 803 and the recording gate pulse conductor 817. In effect this grounds all of the second grids in tubes of unit 21. The gate pulse is, therefore, diverted to ground and renders unit 21 impotent for recording the item that was transiently stored in the computer 17. But the 8-count delay circuit 19 (Fig. 4) nevertheless delivers its timing pulse through conductor 26 and through capacitor 822 (Fig. 8) for driving the cathode follower tube 807 conductive. This tube causes one or the other of the thyratrons 805, 806 to be fired, and hence the answer-back signal is transmitted without disturbing the record of the item in the magnetic storage device 9.

UTILIZATION OF RELAYS 503 AND 504 TO ERASE AND RECORD

It has been mentioned above that, when keys 205 and R are both set for directing an operation, relays 503 and 504 cooperate to obtain a recording of the new item according to the number set up on keys 203, and without any reference to the number previously stored in the magnetic storage device 9. One simple method of accomplishing this is to avoid injecting the old item into the computer, as is normally done by a read-out operation. As herein shown, the make contact of relay 504 (upon energizing this relay) applies an operating potential to conductor 510 leading through the winding of relay 618 and thence to ground. Relay 618 has break contacts for opening that branch of the reading gate pulse generator circuit 614 which leads to the screen grids of the gate tubes 617 and the like in the Reading Amplifier and Gate unit 32. The energization of relay 618, while it nullifies the read-out operation, so that no read-out pulses are delivered to the computer 17, yet it does not interfere with control of the long gate pulse generator tube 611 by the reading gate pulse derived from tube 609. Hence the delayed action counting chain 19 functions normally and times the gating of the recording amplifier unit 21 so as to transmit to the recording heads magnetizing pulses representing "0" and or "1" for each binary digit of the new item. This new item, according to part of the foregoing text, would have been transiently stored in unit 17 at a time intermediate between the generation of the reading gate pulse and of the recording gate pulse. Such is the timing of the new item gates 35.

PREVENTION OF NEGATIVE RESULT RECORDING

When the result of a computation is a minus quantity, it may be undesirable to disturb the inventory balance by permitting the minus result to be recorded. This is particularly true where my invention is utilized as a "Reservisor." An inventory of available seats for a transport plane, for example, cannot be of negative value, but if the attempt to reserve more seats than are available develops a "No" answer, what seats are yet available without filling the excessive requisition should be held in the inventory for a later requisition which is not excessive. This explains why the recording operation should be prevented under such circumstances if a negative result signal is transmitted over conductor 40. In other applications of my invention, however, it may be desirable to record a negative result, in which case I would arrange for the activation of tube 802 by the signal from unit 19 without interference from a blocked state in tube 801.

To review the effects of the negative result signal, it triggers tube 18, thereby causing tube 801 to be blocked. This tube if not blocked would have maintained a sufficient voltage drop in its cathode resistor 812 to render tube 802 responsive to the recording gate signal from unit 19. Otherwise the screen grid potential in tube 802 would be so low that it could not be unblocked by a positive gating pulse applied to its control grid. Hence the recording gate pulse generator 20 would fail to function and the recording operation would be avoided, which is as it should be under the circumstances.

RECAPITULATION

In the foregoing text of the specification I have found it to be convenient to intersperse descriptive outlines of the components with explanations of their respective functions and how they cooperate one with another. It is believed to be in the interest of clarity of disclosure to do so rather than to set forth at first a mere catalog of components of so elaborate a system as this one of my invention, and then to confine the text to explanations of the mode of operation. Be that as it may, the coordination of parts of this typical embodiment has been fully covered.

It will be understood by those skilled in the art that it is within the scope of my invention to substitute alternative components for those specified for my preferred embodiment and to expand or to contract the numerical range of items to be dealt with, also the digital range of numbers to be stored as an inventory balance or as a new item.

I claim:

1. Magnetic data storage equipment having a continuously rotatable member for recording signals representative of numerical items of data in classified order along a plurality of paths, different paths corresponding to different digits of the numbers, a recording head and a reading head for scanning each path, a pulse generator maintained in synchronism with the rotation of said member, an electronic counting chain and a starting device therefor responsive to pulses received from said generator and operable upon release in timed relation to the rotation of said member and said counting chain to operate in step with said pulse generator for counting a series of item locations along said paths, reading gates, means including a coincidence gate jointly controlled by said counting chain and by a signal responsive index selector for causing a selected item to be read by said reading gates, an electronic storage and computing device into which signals representing the numerical value of the item as read may be introduced and combined additively or subtractively with the numerical value of a new item represented by signals derived from a given control signal source to produce a new inventory balance, an operation director selectively operable from said source to determine whether the combining of the numerical values of said items is to produce a sum or a difference, said operation director serving also to deliver a releasing signal to said starting device and to control the mode of utilization of output from said storage and computing device, recording pulse transmitting means including amplifiers subject to conditioning by output signals denoting said new inventory balance as derived from said computer, said amplifiers being gated under delayed control by means including said concidence gate and being effective to actuate said recording heads for magnetically storing said new balance in its proper place on said rotatable member, and answer-back means controlled in accordance with the result obtained by the computer for remotely indicating the results of operation of said equipment.

2. In an inventory system, a keyset having keys settable to designate the item group and the index number of an item in a particular group, keys settable to designate the numerical value of an item to be injected into the inventory for changing its balance, and keys for directing the mode of operation of the system, a magnetic data storage unit arranged an adapted for continuous movement, a plurality of reading heads, recording heads, and associated circuits arranged and adapted to scan certain tracks of said storage unit thereby to read and record signals out of and into the same; an electronic device for so gating the operation of said circuits that read-out and recording functions are restricted to a selected item, said electronic device being subject to control jointly by signals initiated by said keys which designate the index number and index signals generated in timed relation with the movement of the storage unit, means including a circuit for effecting the gating operation of said electronic device when coincidence is reached between the signals which designate the index number and the generated index signals, an electronic storage and computing unit receptive of input signals which are gated thereto from said reading circuits and receptive of input signals which are derived from the setting of said keys to designate the value of an item which is to alter the balance of the inventory, means selectively operable by signals from said mode-of-operation keys for causing the computer to add or subtract, and signal means controlled in accordance with the result obtained by the computer for manifesting the result of the computation.

3. In a device of the class described, the combination of reading heads, a magnetic data storage member having recording tracks continuously movable past said heads for cyclic scanning thereof, a pulse generator synchronously controlled with respect to the cyclic movement of said member, an electronic counting chain progressively settable by pulses from said generator for registering signals representing a binary series of index numbers, each of said numbers corresponding to a different data storage position along said recording tracks, a signaling station, means under control of certain of the signals from said station for selecting a desired data storage position along said tracks for interrogation of its record, said means comprising a coincidence unit jointly conditioned by said certain of the signals and the signals registered by the counting chain and adapted to deliver a signal when the index number of the selected data storage position is reached in the course of the progressive setting of said counting chain, means responsive to said last-named signal for timing a read-out operation by said reading heads, an electronic computer having digital stages and carry circuits, means for storing in said computer signals representing a binary number corresponding to the magnetically recorded number picked up by said read-out operation, means under control of said signaling station for causing signals representing the binary digits of a new item to be injected into said computer, thereby to register the result of subtracting it from the number obtained by the read-out operation, an answer back signaling device controlled in accordance with the result obtained by the computer and means operable in the signaling device for transmitting to said signaling station either of two different signals respectively for indicating whether the result obtained by the computer is a positive numerical remainder or a negative numerical remainder.

4. In combination, a statistical data storage device having a continuously running magnetic member capable of spot magnetization at predetermined points along parallel endless record tracks, there being a separate track for each element of a given code signal and different uniformly spaced storage points along said tracks being assigned to different code signals according to their classification, scanning means including reading heads and recording heads operatively associated with said tracks whereby code signals may be read out of and recorded on said magnetic member, a control station having selecting means and code signal transmitting means, means responsive to code signals from the control station for directing and timing the operation of said reading heads as to obtain a read-out of a code signal which is stored at some selected point along said tracks, a temporary storage and computing unit having a flip-flop tube stage for each digit of a numerical item as represented by a given code signal, said unit being receptive to such a signal when derived from a read-out operation and also receptive to a code signal derived from said control station, means in said computer unit operative to combine the effects of two control signals so derived, thereby to obtain in one case the sum of the numerical values represented by said signals, and in another case the difference between said values, and means for activating said recording heads under control of said computing unit, thereby to store on said magnetic member a code signal representing said sum or difference.

5. The combination as defined by claim 4 and including an answer-back signalling system automatically operative in accordance with the result obtained by the computer unit to transmit information to said control station regarding said result.

6. In a device of the class described, the combination of a continuously rotatable magnetic storage member having a cylindrical surface around which provision is made to record different statistical items in classified order, means including groups of recording heads arranged to apply to said surface discrete spots of magnetic polarization, means including other groups of reading heads arranged to detect the polarities of selected spot combinations which represent the storage of permutationally different code signals, said surface having a series of uniformly magnetized spots along a circular path, a reading head arranged to scan said series of magnetized spots, an electronic counting chain operable under control of pulses generated by the scanning action of this reading head, a source of input signals including an item designation signal, a selector controlled by said item designation signal and operable to locate any particular position of orientation of said member which corresponds with a space assignment for recording items of a particular class, and means selectively operable in response to certain of said input signals either to record for storage, or to read out what is stored, a single code signal of any desired class, this means being operable under joint control of said electronic counting chain and of said position-of-orientation selector.

7. In a rotary magnetic storage system for statistical data, a continuously movable magnetic recording medium having thereon a plurality of record paths along which signals representing values of different items of said data may be magnetically stored, recording heads and associated circuits arranged and adapted to scan said paths and produce spot magnetization at selected points along said paths, reading heads and associated circuits arranged and adapted to obtain a read-out of signals representing the values of said data as magnetically stored by said recording heads along said paths, an electronic computing register responsive to a read-out operation and serving to transiently store signals representing a numerical item thus read out and to compute the sum or difference between the value of the item transiently stored therein and the value of a second numerical item represented by other signals injected therein, a coincidence unit into which signals representing a desired index number may be injected, means including a read-out circuit for producing timing pulses having a synchronous relation to the scanning movement of said recording medium, an electronic counting chain progressively operative by said timing pulses, an electronic gate arranged to be conditioned for causing the injection of signals representing the value of the first named numerical item into said register according to what is selected for signal read-out by said reading heads, means for conditioning said coincidence unit jointly by signals from said counting chain and by signals representing said index number, means including said coincidence unit and operative when agreement is reached between said index number and the count of pulses to which said counting chain responds for conditioning said gate, means including said gate for injecting said other signals representing the value of the second of said two items into said register, and signal means controlled in accordance with the result obtained by said register for manifesting whether the second item when subtracted from the first item produces a new balance which is less than a predetermined minimum value or whether said balance is equal to or greater than said minimum value.

8. A magnetic data storage device having a continuously driven magnetic storage medium and recording tracks thereon with associated recording and reading heads, in combination with a calling station having means for transmitting signals and electronic equipment controlled thereby, operative to magnetically record signals representing the numerical value of a new item of data in place of signals representing the numerical value of a prior item of data at a selected position along a selected group of said tracks on said device, said electronic equipment including an electronic computer receptive to signals read out from the storage device representing the numerical value of said prior item of data and incoming signals derived from said calling station which denote the numerical value of an item of data to be added to or subtracted from the prior item, said incoming signals including a directive signal that determines whether said item of data is to be added to or subtracted from said prior item, means including an operation director unit responsive to said directive signal for causing said computer in one case to add together the numerical values of the two items represented by said signals, and in another case to subtract the numerical value represented by said incoming signals from the numerical value of the prior item, means controlled in accordance with the result obtained by said computer for manifesting whether or not the new balance obtained after performing said subtraction is less than a predetermined minimum value, and means including electronic gating devices controlled in accordance with said result obtained by the computer for causing the recording in said storage device of signals representative of the new balance as said new item only in the event that the new balance is equal to or greater than said minimum value.

9. In an inventory posting system, a rotary magnetic storage device having item category positions disposed along a plurality of endless tracks, a plurality of said tracks each appropriate to one of the digits of a binary number, reading heads, recording heads and individual circuits therefor arranged and adapted to scan said tracks for respectively reading and recording magnetically stored signals representative of statistical items thereon, a source of input signals including signals representative of an index designation and the numerical value of a new item and indicating whether the new item is to be added to or subtracted from the inventory, a pulse generator operable in phase with the scanning action of said heads, indexing means responsive to coincidence between the index designations in said input signals and index signals generated by said pulse generator for locating selected ones of said category positions at will, gating means for effecting read-out operations from the selected category positions when said coincidence is reached, an add-subtract computer arranged and adapted to transiently store signals which constitute a read-out of the numerical value of a selected statistical item derived from the operation of said reading heads to combine therewith either additively or subtractively as determined by said input signals the numerical value of a new item, means to transmit to said recording heads signals representing the numerical value of the computed result only when it is zero or greater than zero in a numerical sense, and an operation director unit selectively operable in response to certain of said input signals to control the functioning of said computer.

10. In a data storage system, a continuously movable magnetic recording medium, a plurality of reading heads, recording heads and individual circuits connected to said heads, all suitably coordinated with said medium for simultaneously scanning different endless tracks thereon, a calling station having means for transmitting input signals including signals representative of an index designation and a number representing an availability inquiry or a requisition in regard to a magnetically stored statistical item and accompanied by a directive signal to indicate which operation is requested, a pulse generator operable in phase with the movement of said medium, indexing means jointly conditioned by the index designation in said input signals and by timing signals generated by the pulse generator during the movement of said medium, means including electronic gating devices operative when coincidence is reached between said last named signals for gating the individual circuits of said reading and recording heads respectively to select for read-out and/or for recording signals representing the numerical value of one of said statistical items, means responsive to a read-out operation and to the input signals representing an inquiry or a requisition for comparing the numerical value of a selected magnetically stored item with the number representing the inquiry or requisition in said input signals, means controlled by said directive signal for preventing said gating devices from activating said recording heads whenever an availability inquiry only is received from the calling station, and signaling means controlled by said comparing means and operative to report the result of the comparison.

11. Apparatus according to claim 10 and including an operation director unit selectively operable in response to said directive signal to disable the electronic gating devices of the recording head circuits whenever the operation of the system is to be restricted to inquiry purposes as determined by said signals.

12. Apparatus according to claim 10 in which the comparing means is an electronic computer operative to combine the effects of said read-out and input signals is an operation of addition or subtraction, and means operative when a requisition is requested for so gating the output from said computer that when positive and zero numerical remainders are obtained by the computer they are applied to said recording heads and when negative numerical remainders are obtained by the computer they are suppressed.

13. In a numerical data storage system, a continuously movable magnetic recording medium having a plurality of recording tracks, an operating station for transmitting control signals and signals having numerical significance, a pulse generator operative coincidentally with the movement of said medium, indexing means jointly conditioned by certain of said control signals and signals generated by the pulse generator during movement of said medium for selectively locating a position linearly of recording tracks which are borne by said medium, said position being that to which a particular inventory item balance is assigned for magnetically storing signals representative of said balance, means including reading heads and circuits connected thereto, gating means operative when coincidence is reached between the control signals and those supplied by the pulse generator to said indexing means, for causing a read-out of signals representing the numerical datum stored at the selected position, a computer receptive of signals generated by the read-out operation and further receptive of numerical signals from said operating station which represent the numerical value of a new item, an operation director unit responsive to certain of the control signals from said station for directing said computer either to subtract the new item from the numerical value of the datum read out or to add the new item to said numerical value, an answer-back signaling system controlled in accordance with the result obtained by the computer and operable to cause the manifestation of one indication when the computer delivers a numerical result which is of positive or zero value, and a negative indication when said result is negative.

14. Apparatus as defined in claim 13 and having means including recording heads and circuits connected thereto, amplifiers having input circuits subject to control by said computer and output circuits connected to said recording heads through their respective circuits, a delay circuit for causing the output from said amplifiers to be gated to the recording heads after a fixed time interval following the gating of said reading circuits, and means for preventing the gating action of said delay circuit whenever the computer derives a negative result.

15. In a storage and computing system for statistical items, a constantly traveling magnetic member having endless record tracks for storing signals representative of the numerical values of said items, a reading head and a recording head each arranged and adapted to cyclically scan an associated one of said tracks, a control station having signaling equipment for causing a group of said heads to be simultaneously activated, thereby to read or to record the several elements of a code signal representing the value of a statistical item, finder means operative in synchronism with the movement of said magnetic member for timing the scanning functions of said reading and recording heads in relation to the arrival of an assigned signal storage position along said tracks in reference to any particular statistical item, said finder means being responsive to certain of the signals initiated at said control station and operative to select the signal storage position assigned to a particular one of said statistical items, gating means coacting with said finder means for obtaining read-out of signals representing the value of the selected statistical item, an electronic computer providing temporary storage for code signals both as derived from the activation of said reading heads to obtain a read-out of a selected item from said record tracks, and also as derived from certain of the signals initiated at said control station, means responsive to certain of the signals initiated at the control station for causing said computer to function additively or subtractively at will in combining the numerical values of two items as represented by said derived signals, and means for so activating said recording heads under control of signals representing the combined numerical values produced by the computer that signals representing the result will thereafter be stored in its assigned place along said record tracks, an answer-back signaling system operable under control of said computer for producing one of two indication at said control station, either that said recording heads were successfully activated or that they were not, and means for preventing the activation of said recording heads whenever a negative result is obtained after subtracting the numerical value of the control-station-derived item from the numerical value of the item as derived from a read-out operation.

References Cited in the file of this patent

UNITED STATES PATENTS

| | | |
|---|---|---|
| 1,138,089 | Crumpton | May 4, 1915 |
| 2,099,754 | Robinson | Nov. 23, 1937 |
| 2,236,793 | Furber | Apr. 1, 1941 |
| 2,275,609 | Bryce | Mar. 19, 1942 |
| 2,374,537 | Goldsmith | Apr. 24, 1945 |
| 2,378,389 | Begun | June 19, 1945 |
| 2,420,590 | Everhart | May 13, 1947 |
| 2,432,324 | May | Dec. 9, 1947 |
| 2,439,446 | Begun | Apr. 13, 1948 |
| 2,446,037 | Ammann | July 27, 1948 |
| 2,462,275 | Morton et al. | Feb. 22, 1949 |
| 2,587,532 | Schmidt | Feb. 26, 1952 |
| 2,609,143 | Stibitz | Sept. 2, 1952 |
| 2,611,813 | Sharpless et al. | Sept. 23, 1952 |

FOREIGN PATENTS

| | | |
|---|---|---|
| 385,130 | Italy | Feb. 13, 1941 |

OTHER REFERENCES

"Intelex—Automatic Reservations," J. D. Mountain and E. M. S. McWhirter, Electrical Communication, vol. 25, No. 3, September 1948, pp. 220–231.

"Electric Ticket Reserving System," by W. R. Triem and J. S. Jammer, Electrical Engineering, vol. 69, No. 9, September 1950, pp. 775–780.